United States Patent
Noguchi et al.

(10) Patent No.: US 11,372,401 B2
(45) Date of Patent: Jun. 28, 2022

(54) VEHICLE CONTROL APPARATUS

(71) Applicant: HONDA MOTOR CO., LTD., Tokyo (JP)

(72) Inventors: Junpei Noguchi, Wako (JP); Gaku Shimamoto, Wako (JP); Rikuro Shiraishi, Nagoya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/141,351

(22) Filed: Jan. 5, 2021

(65) Prior Publication Data
US 2021/0216067 A1 Jul. 15, 2021

(30) Foreign Application Priority Data

Jan. 9, 2020 (JP) .............................. JP2020-002422

(51) Int. Cl.
*G06F 3/04886* (2022.01)
*G05D 1/00* (2006.01)
*G06F 3/041* (2006.01)

(52) U.S. Cl.
CPC ......... *G05D 1/0016* (2013.01); *G05D 1/0044* (2013.01); *G05D 1/0055* (2013.01); *G06F 3/04186* (2019.05); *G06F 3/04886* (2013.01); *G06F 2203/04104* (2013.01)

(58) Field of Classification Search
CPC .... G06F 3/0488; G06F 3/0416; G06F 3/0425; G06F 3/165; G06F 3/041; G06F 3/045; G06F 2203/04808; G06F 3/0426; G06F 3/0446; G06F 3/04883; G06F 3/042; G06F 3/0481; G06F 3/0483; G06F 3/04842; G06F 3/04886; G06F 3/013
See application file for complete search history.

(56) References Cited

U.S. PATENT DOCUMENTS

| 10,831,187 | B2 | 11/2020 | Bourassi et al. | |
|---|---|---|---|---|
| 2012/0208519 | A1* | 8/2012 | Seaver | B60R 25/24 455/420 |
| 2015/0375741 | A1* | 12/2015 | Kiriya | G06K 9/00355 701/2 |
| 2017/0241186 | A1* | 8/2017 | Koda | E05F 15/75 |
| 2019/0018404 | A1* | 1/2019 | Bourassi | B62D 15/0285 |
| 2019/0129438 | A1* | 5/2019 | Morita | G01C 21/3623 |

FOREIGN PATENT DOCUMENTS

JP    2019-514088 A    5/2019

* cited by examiner

*Primary Examiner* — Rayeez R Chowdhury
(74) *Attorney, Agent, or Firm* — Thomas | Horstemeyer, LLP

(57) ABSTRACT

A vehicle control apparatus is provided. The apparatus includes an operation screen including a contact sensor and remotely issues an instruction to move a vehicle, wherein output of the instruction to move the vehicle is started based on a reciprocating operation on the operation screen in a case in which the reciprocating operation has satisfied a predetermined condition, and the predetermined condition includes a condition related to at least one of a cumulative distance and a count of a stroke of the reciprocating operation.

11 Claims, 15 Drawing Sheets

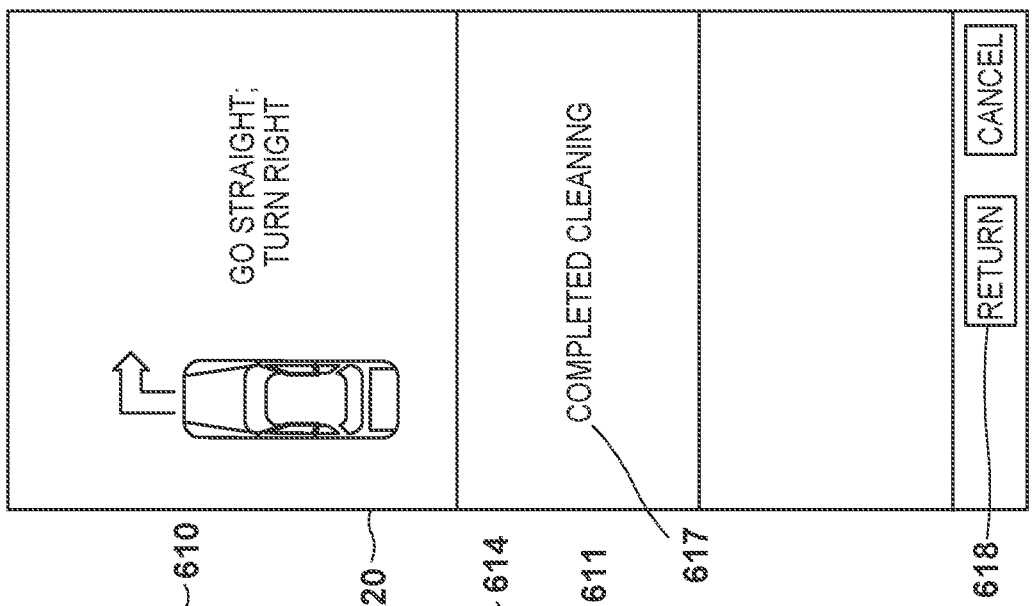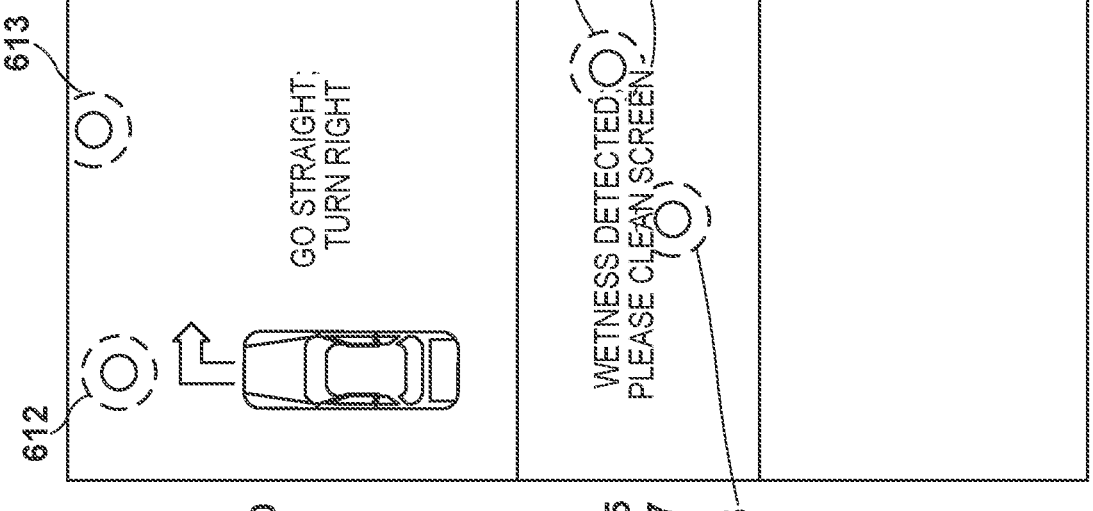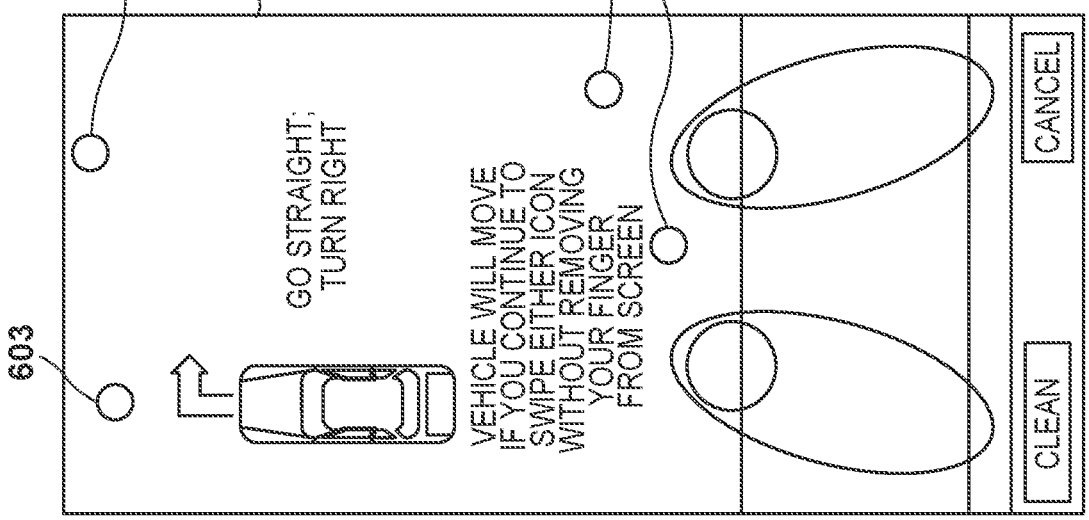

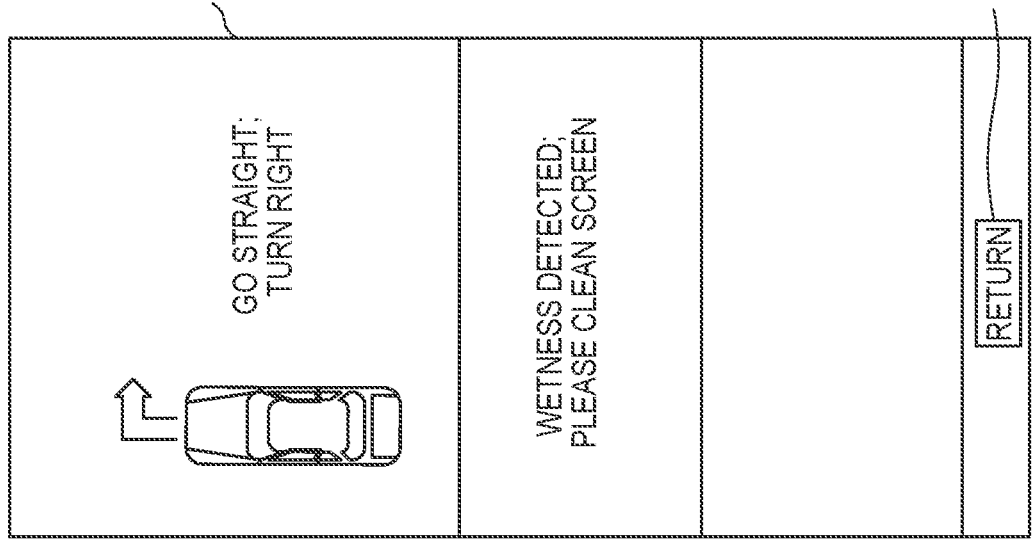
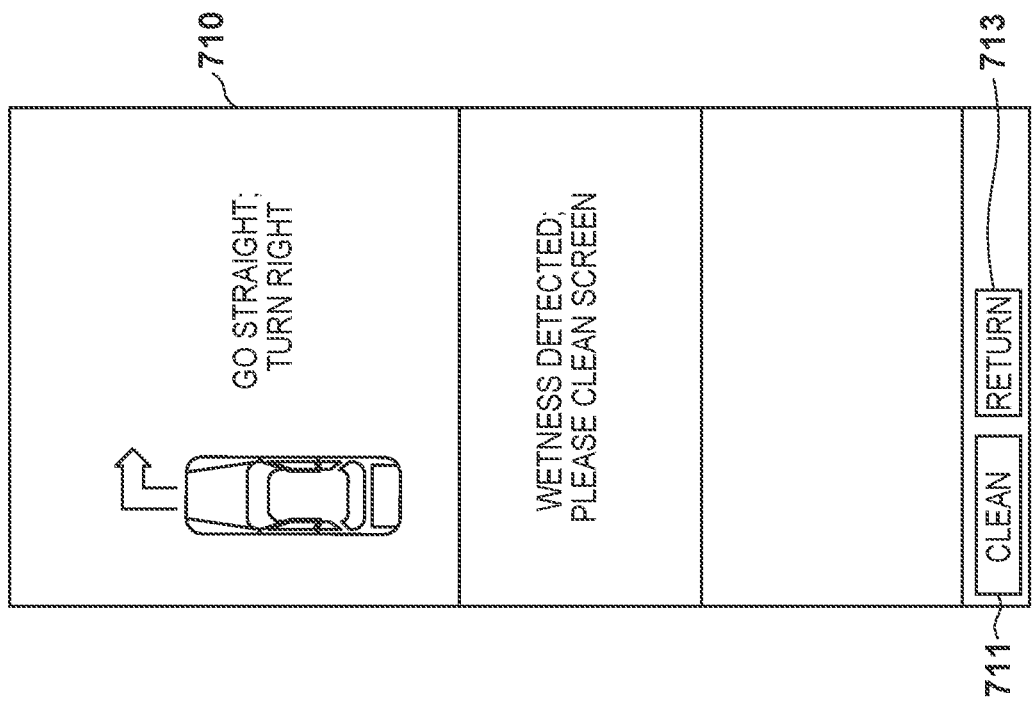

VEHICLE CONTROL APPARATUS

CROSS-REFERENCE TO RELATED APPLICATION(S)

This application claims priority to and the benefit of Japanese Patent Application No. 20204002422 filed on Jan. 9, 2020, the entire disclosure of which is incorporated herein by reference.

BACKGROUND OF THE INVENTION

Field of the Invention

The present invention relates to a vehicle control apparatus for remote control of a vehicle.

Description of the Related Art

In recent years, an automated-driving vehicle that can automatically travel while detecting obstacles and the like is being developed, and there is, as one of the automated driving technique functions, a function that can automatically park a vehicle in a parking space. Furthermore, as an automatic parking function, there is an automatic parking function that can park a vehicle by remote control by using a mobile phone (for example, see Japanese Patent Laid-Open No. 2019-514088). In the technique disclosed in Japanese Patent Laid-Open No. 2019-514088, an automated-driving vehicle performs travel for automatic parking while an operator is drawing a circle continuously on an operation surface (also referred to as an operation screen) of a mobile phone. The operator will need to continue this operation until the vehicle reaches a final position and the parking is completed.

Even when parking is being performed by automated driving, the operator needs to have the operation under his/her control for the sake of safety.

However, unintentional contact tends to occur on the operation screen of a mobile phone, and automated driving that is not under the control of a driver may be started problematically due to such unintentional contact.

SUMMARY OF THE INVENTION

The present invention provides a remote control apparatus for controlling automated driving by determining the validity of an operation performed by an operator when automated driving is to be performed by remote control.

The present invention includes the following arrangement. According to one aspect of the present invention, there is provided a vehicle control apparatus that includes an operation screen including a contact sensor and remotely issues an instruction to move a vehicle, wherein output of the instruction to move the vehicle is started based on a reciprocating operation on the operation screen in a case in which the reciprocating operation has satisfied a predetermined condition, and the predetermined condition includes a condition related to at least one of a cumulative distance and a count of a stroke of the reciprocating operation.

According to the present invention, a remote control apparatus that controls automated driving by determining the validity of an operation performed by an operator to suppress the movement of a vehicle from being caused by a careless operation can be provided.

BRIEF DESCRIPTION OF THE DRAWINGS

FIGS. 6A, 6B, and 6C are views each showing an example of the operation screen when raindrops are detected;

FIGS. 7A and 7B are views each showing an example of the operation screen when the raindrops are detected:

DESCRIPTION OF THE EMBODIMENTS

First Embodiment

Figure 1:
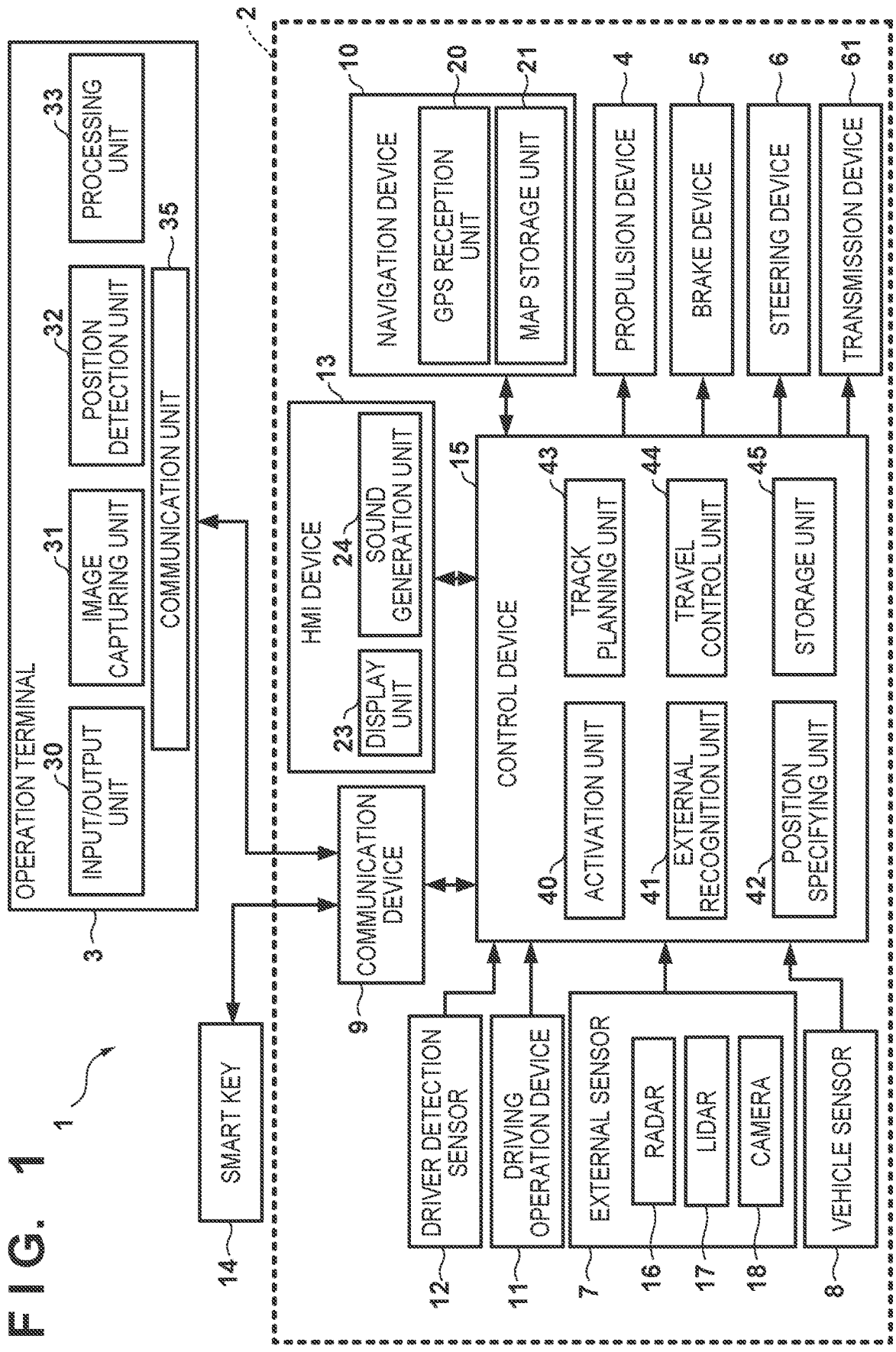
FIG. 1 is a block diagram showing the arrangement for controlling an automated driving vehicle.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Arrangement

A vehicle control system that includes an automated driving vehicle and an operation terminal device (to be also referred to as an operation terminal or a remote operation terminal hereinafter) will be described first. As shown in FIG. 1, a vehicle control system 1 includes a vehicle system 2 mounted on a vehicle, and an operation terminal 3. The vehicle system 2 includes a propulsion device 4, a brake device 5, a steering device 6, a transmission device 61, an external sensor 7, a vehicle sensor 8, a communication device 9, a navigation device 10, a driving operation device 11, a driver detection sensor 12, an interface device (HMI device) 13, a smart key 14, and a control device 15. The components of the vehicle system 2 are connected so as to be able to transmit signals by an in-vehicle communication network such as a CAN (Controller Area Network).

The propulsion device 4 is a device that gives a driving force to the vehicle, and includes, for example, a power source. The transmission device 61 is, for example, a continuously variable transmission or a multistage transmission, and changes the rotation speed of a driven axis with respect to the rotation of an driving axis. The power source includes at least one of an electric motor and an internal combustion engine such as a gasoline engine or a diesel engine. The brake device 5 is a device that gives a braking force to the vehicle, and includes, for example, a brake caliper that presses a pad against a brake rotor, and an electric cylinder that supplies an oil pressure to the brake caliper. The brake device 5 includes a parking brake device that regulates the rotation of wheels by a wire cable. The steering device 6 is a device configured to change the steering angle of the wheels, and includes, for example, a rack-and-pinion mechanism that steers the wheels, and an electric motor that drives the rack-and-pinion mechanism. The propulsion device 4, the brake device 5, and the steering device 6 are controlled by the control device 15.

The external sensor 7 is a sensor that detects an object on the periphery of the vehicle, and the like. The external sensor 7 includes a radar 16, a LIDAR (Light Detection and Ranging) 17, and a camera 18, and outputs a detection result to the control device 15.

The radar 16 is, for example, a millimeter wave radar, and can detect an object around the vehicle and measure the distance to an object by a radio wave.

A plurality of radars 16 are provided around the vehicle, and the radar 16 is provided, for example, at the center of the front portion of the vehicle, at each corner of the front portion, and at each corner of the rear portion.

The LIDAR 17 can detect an object around the vehicle and measure the distance to an object by light. A plurality of LIDARs 17 are provided around the vehicle, and the LIDAR 17 is provided, for example, at each corner of the front portion of the vehicle, at the center of the rear portion, and on each side of the rear portion.

The camera 18 is a device that captures the periphery of the vehicle, and is, for example, a digital camera using a solid-state image capturing element such as a CCD or a CMOS. The camera 18 includes a front camera that captures the front of the vehicle, and a rear camera that captures the rear. The camera 18 includes a pair of left and right door mirror cameras that are provided near the door mirror installation places of the vehicle and capture the rear of the left and right sides.

The vehicle sensor 8 includes a vehicle speed sensor that detects the speed of the vehicle, an acceleration sensor that detects an acceleration, a yaw rate sensor that detects the angular velocity about a vertical axis, and an azimuth sensor that detects the direction of the vehicle. The yaw rate sensor is, for example, a gyro sensor.

The communication device 9 mediates wireless communication between the control device 15 and a communication unit 35 of the operation terminal 3. That is, the control device 15 can communicate with the operation terminal 3 held by a user via the communication device 9 using, for example, a communication method such as infrared communication or Bluetooth®.

The navigation device 10 is a device that acquires the current position of the vehicle and performs route guidance to a destination, and the like, and includes a GPS reception unit 20 and a map storage unit 21. The GPS reception unit 20 specifies the position (a latitude and a longitude) of the vehicle based on a signal received from an artificial satellite (positioning satellite). The map storage unit 21 is formed by a storage device such as a flash memory or a hard disk, and stores map information.

The driving operation device 11 is provided in a cabin, and accepts an input operation performed by the user to control the vehicle. The driving operation device 11 includes, as driving operation units, for example, a steering wheel, an accelerator pedal, a brake pedal, a parking brake device, a gear shift lever, and a push start switch (engine start switch). The push start switch accepts an input operation for activating the vehicle by a driving operation from the user. The driving operation device 11 includes a sensor that detects an operation amount, and outputs a signal representing the operation amount to the control device 15.

The driver detection sensor 12 is a sensor configured to detect whether a person is sitting on the driver's seat. The driver detection sensor 12 is, for example, a seating sensor provided on the seating surface of the driver's seat. The seating sensor may be of a capacitance type, or may be a membrane switch that is turned on when a person sits on the driver's seat. The driver detection sensor 12 may be an indoor camera that captures the user sitting on the driver's seat. The driver detection sensor 12 may be a sensor that acquires the presence/absence of insertion of the buckle of the tongue of the seat belt of the driver's seat and detects that a person is sitting on the driver's seat and is wearing the seat belt. The driver detection sensor 12 outputs a detection result to the control device 15.

The interface device (HMI device) 13 provides an interface (HMI: Human Machine Interface) between the user and the control device 15, notifies the user of various kinds of information by display or a sound, and accepts an input operation by the user. The interface device 13 includes a display unit 23 that is formed by a liquid crystal, organic EL, or the like and functions as a touch panel capable of accepting an input operation from the user, and a sound generation unit 24 such as a buzzer or a speaker.

The control device 15 is an electronic control unit (ECU) including a CPU, a nonvolatile memory (ROM), and a volatile memory (RAM). The control device 15 can execute various kinds of vehicle control by executing arithmetic processing based on a program by the CPU. At least some of the functional units of the control device 15 may be implemented by hardware such as an LSI, an ASIC, or an FPGA, or may be implemented by a combination of hardware and software.

The smart key 14 (FOB) is a wireless terminal that the user can carry, and is configured to be communicable with the control device 15 via the communication device 9 from the outside of the vehicle. The smart key 14 includes buttons used by the user to perform input. The user can operate the buttons of the smart key 14 to lock the doors (door lock), unlock the doors (door unlock), activate the vehicle, and the like.

The operation terminal 3 is a wireless terminal that can be carried by the user, and can communicate with the control device 15 via the communication device 9 from the outside of the vehicle. In this embodiment, the operation terminal 3 is, for example, a portable information processing apparatus such as a smartphone or the like. A predetermined application can be installed in the operation terminal 3 so that the operation terminal 3 will be able to communicate with the control device 15. Information (for example, a terminal ID which includes a predetermined numerical value, a character string, and the like for identifying each operation terminal) which allows identification of the operation terminal 3 is set in the operation terminal 3, and the control device 15 can authenticate the operation terminal 3 based on the terminal ID.

As shown in FIG. 1, the operation terminal 3 includes, as functional components, an input/output unit 30, an image capturing unit 31, a position detection unit 32, a processing unit 33, and the communication unit 35.

The input/output unit 30 presents information to the user who operates the operation terminal 3, and accepts input from the user who operates the operation terminal 3. The input/output unit 30 functions as, for example, a touch panel. Upon accepting input from the user, the input/output unit 30 outputs a signal corresponding to the input to the processing unit 33. The input/output unit 30 further includes a sound input/output device and a vibration generation device (both not shown). The sound input/output device can output a digital signal as a sound and can also convert a sound input into a digital signal. The vibration generation can vibrate the housing of the operation terminal 3 by generating a vibration with a sound output or instead of a sound output.

The image capturing unit 31 can capture an image (a still image or a moving image) in accordance with an image capturing mode set from the input/output unit 30. The image capturing unit 31 is, for example, a digital camera formed by a CMOS or the like. The processing unit 33 performs predetermined image processing for an image obtained by capturing the user who operates the operation terminal 3 to acquire a feature of the image, and compare the feature with the feature of the face image of the user registered in advance to authenticate the user.

The position detection unit 32 includes a sensor capable of acquiring position information of the operation terminal 3. The position detection unit 32 can acquire the position of the operation terminal 3 by, for example, receiving a signal from a positioning satellite (GPS satellite). In addition, the position detection unit 32 can also acquire position information including the relative position of the operation terminal 3 with respect to the vehicle by communicating with the control device 15 via the communication device 9. The position detection unit 32 outputs the acquired position information to the processing unit 33.

The processing unit 33 transmits a terminal ID set in the operation terminal 3, a signal from the input/output unit 30, and position information acquired by the position detection unit 32 to the control device 15. Upon receiving a signal from the control device 15, the processing unit 33 processes the signal and causes the input/output unit 30 to present information to the user who is operating the operation terminal 3. Information presentation is performed by, for example, display on the input/output unit 30. The communication unit 35 will execute wireless or wired communication with the communication device 9. Assume that the communication unit will execute wireless communication in this description.

The control device 15 can drive the vehicle based on a signal from the operation terminal 3. The control device 15 can also perform remote parking by moving the vehicle to a predetermined position. To control the vehicle, the control device 15 includes at least an activation unit 40, an external recognition unit 41, a position specifying unit 42, a track planning unit 43, a travel control unit 44, and a storage unit 45.

The activation unit 40 authenticates the smart key 14 based on a signal from the push start switch, and determines whether the smart key 14 exists in the vehicle. When the smart key 14 is authenticated, and the smart key 14 exists in the vehicle, the activation unit 40 starts driving the propulsion device 4. Alternatively, upon receiving an activation instruction signal from the operation terminal 3, the activation unit 40 authenticates the operation terminal 3 and starts driving the vehicle upon authentication. When starting the driving of the vehicle, if the propulsion device 4 includes an internal combustion engine, the activation unit 40 turns on a spark device (ignition).

Based on the detection result of the external sensor 7, the external recognition unit 41 recognizes, for example, an obstacle such as a parked vehicle or a wall existing on the periphery of the vehicle, and acquires information such as a position and a size concerning the obstacle. In addition, the external recognition unit 41 analyzes an image acquired by the camera 18 by an image analysis method such as pattern matching, and acquires the presence/absence of an obstacle and its size. Also, the external recognition unit 41 can calculate the distance to an obstacle using signals from the radars 16 and the LIDARs 17 and acquire the position of the obstacle.

The position specifying unit 42 can detect the position of the vehicle based on a signal from the GPS reception unit 20 of the navigation device 10. In addition to the signal from the GPS reception unit 20, the position specifying unit 42 can acquire a vehicle speed and a yaw rate from the vehicle sensor 8 and specify the position and posture of the vehicle using so-called inertial navigation.

The external recognition unit 41 can analyze the detection result of the external sensor 7, more specifically, an image captured by the camera 18 based on image analysis method such as pattern matching and acquire, for example, the position of a white line drawn on the road surface of a parking area or the like.

The travel control unit 44 controls the propulsion device 4, the brake device 5, and the steering device 6 based on a travel control instruction from the track planning unit 43 and makes the vehicle travel.

The storage unit 45 is formed by a RAM or the like, and stores information necessary for processing of the track planning unit 43 and the travel control unit 44.

When the user makes an input to the HMI device 13 or the operation terminal 3, the track planning unit 43 calculates a track which is to serve as the travel route of the vehicle as needed, and outputs a travel control instruction to the travel control unit 44.

When the user makes an input corresponding to a wish for parking assistance by remote operation (remote parking assistance) after the vehicle has stopped, the track planning unit 43 will execute parking assistance processing.

Parking Assistance Control by Remote Operation

In a case in which parking assistance processing is to be performed, the track planning unit 43 first performs acquisition processing for acquiring an available parking position. The track planning unit 43 acquires, based on the signals from the external sensor 7, the position and the size of each obstacle and the position of the white line drawn on the road surface. The track planning unit 43 extracts each space where parking is possible (to be referred to as an available parking position hereinafter) based on the acquired position and size of each obstacle and the white line.

Next, the track planning unit 43 executes parking position acceptance processing of accepting a parking position from the available parking positions. When the track planning unit 43 has acquired at least one available parking position, the track planning unit 43 causes the display unit 23 to display a notification to instruct the user who is driving the vehicle to stop the vehicle. At this time, after making the user stop the vehicle, the track planning unit 43 can instruct the user to change the gear shift lever to the parking position.

The track planning unit 43 causes the display unit 23 to display the current location of the vehicle and the available parking positions. At this time, the track planning unit 43 can also cause the display unit 23 to display an image captured by the camera 18 by overlaying the captured image on the current location and the available parking positions that are being displayed. Subsequently, the track planning unit 43 causes the display unit 23 to display a notification to prompt the user to select one position (parking position) where the vehicle is to be parked among the available parking positions. When a desired parking position has been input by the user, the display unit 23 outputs a signal corresponding to the input parking position to the track planning unit 43.

At this time, the track planning unit 43 acquires, based on a position touched by the user, the parking position desired by the user. At this time, the track planning unit 43 can cause the display unit 23 to display a button to allow the user to select forward parking or reverse parking. The track planning unit 43 can calculate a track from the current location of the vehicle to the parking position corresponding to each of forward parking and reverse parking, and cause the display unit 23 to display each calculated track. The display unit 23 allows the user to select forward parking or reverse parking by a touch operation on a track, and outputs the selection result to the track planning unit 43.

Next, upon receiving the parking position input by the user from the display unit 23, the track planning unit 43 executes track calculation processing to calculate a track of the vehicle from the current location to the parking position. When a user input operation related to the selection of forward parking and reverse parking is received, the track planning unit 43 can calculate the track based on the input from the user in addition to the current location of the vehicle and the parking position.

When the calculation of the track is completed, the track planning unit 43 causes the display unit 23 to display a notification to prompt the user to exit from the vehicle and a notification to instruct the user to activate an application for remote parking on the operation terminal 3. In accordance with these notifications, the user will activate the application on the operation terminal 3 after exiting the vehicle.

Subsequently, an input button for executing connection to the vehicle is displayed on the input/output unit 30 of operation terminal 3. When the input button is touched by the user, the track planning unit 43 executes authentication processing to authenticate the operation terminal 3 by using the terminal ID transmitted from the processing unit 33. When the authentication of the operation terminal 3 is completed, the current location of the vehicle, the track, the parking position, and an up/down arrow are displayed on the input/output unit 30. Subsequently, the user can perform inputs on the operation terminal 3 to instruct the track planning unit 43 to execute remote parking processing. The remote parking processing includes moving processing for moving the vehicle to the parking position and parking processing for parking the vehicle in the parking position.

When the user swipes in accordance with a guide displayed on the input/output unit 30 of the operation terminal 3, the operation terminal 3 transmits an operation amount signal corresponding to the swipe amount to the track planning unit 43. The track planning unit 43 converts the operation amount signal into the movement amount of the vehicle, and executes moving processing to move the vehicle in accordance with the calculated movement amount along the track until the vehicle reaches the parking position.

In the moving processing, the track planning unit 43 determines whether the vehicle has reached the parking position, and executes the parking processing to park the vehicle when the vehicle is determined to have reached the parking position. In the parking processing, the track planning unit 43 first causes the brake device 5 of the travel control unit 44 to be driven. Thereafter, track planning unit 43 causes the parking brake of the travel control unit 44 to be driven. When the suspension of the vehicle is completed, the track planning unit 43 transmits a parking complete notification indicating the completion of the parking to the operation terminal 3.

When the parking complete notification is received by the operation terminal 3, a notification indicating the completion of parking is displayed on the input/output unit 30 of the operation terminal 3, and the application on the operation terminal 3 is ended. As a result, the parking assistance processing is completed.

Terminal Device

Figure 2:
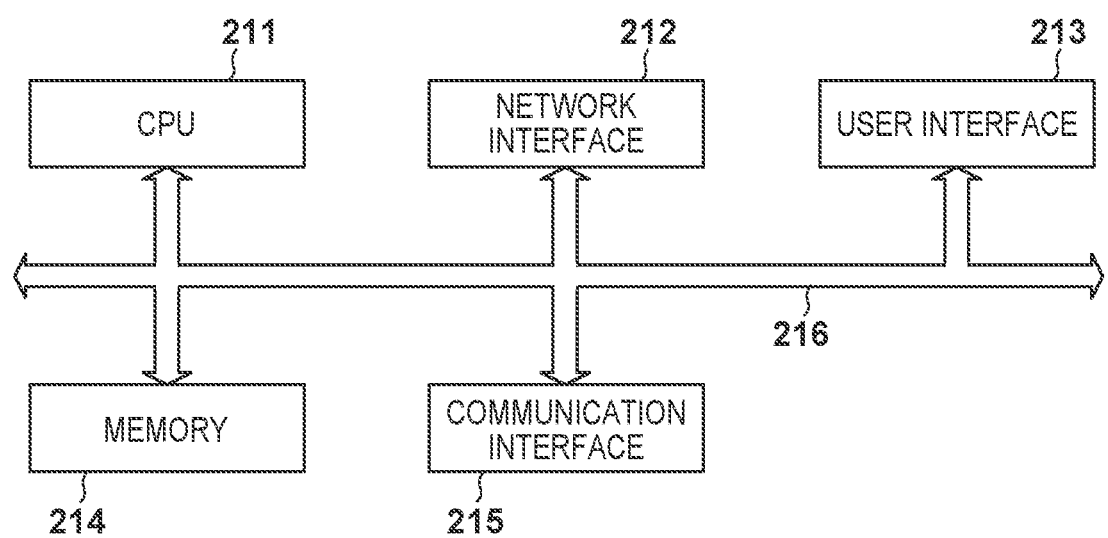
FIG. 2 is a block diagram showing hardware of a terminal device.

FIG. 2 is a block diagram showing the arrangement of the operation terminal 3 such as a mobile phone or the like which is used for remotely issuing an instruction to move the vehicle and a travel instruction for parking. In particular, FIG. 2 mainly shows the arrangement of the processing unit 33 shown in FIG. 1. In FIG. 2, a CPU 211 executes predetermined processing by executing a program stored in a memory 214 which is connected by a bus 216, and executes processing of data similarly stored in the memory 214, communication with the vehicle system 2 via a network and a communication interface, and procedures indicated in flowcharts (to be described later). A network interface 212 communicates with another network device by a wireless LAN or the like. A user interface 213 corresponds to the input/output unit 30, and is a device obtained by combining a display device and an input device which includes a keyboard and a contact sensor (alternatively, a touch sensor) such as a touch panel. This user interface 213 forms the operation screen of the operation terminal 3. The user interface 213 is a device for presenting information to the user and inputting instructions and information from the user. A communication interface 215 is an interface for executing communication in compliance with a mobile phone standard, and mediates communication with the vehicle system 2.

Remote Parking Application

A remote parking application for supporting remote parking of the vehicle is executed by the arrangement of the terminal device described above. This application will be described below. By this remote parking application, an operator can operate the operation terminal 3 to start the automated driving of the vehicle and to cause the vehicle to continue to travel along a determined track. An example of the screen and an operation example will be described first. Note that the following description is executed from the point of time at which a parking operation is to be started after the track of the automatic parking has been determined and user authentication has been completed by the activation of the remote parking application.

Screen and Operation

Figure 3A:
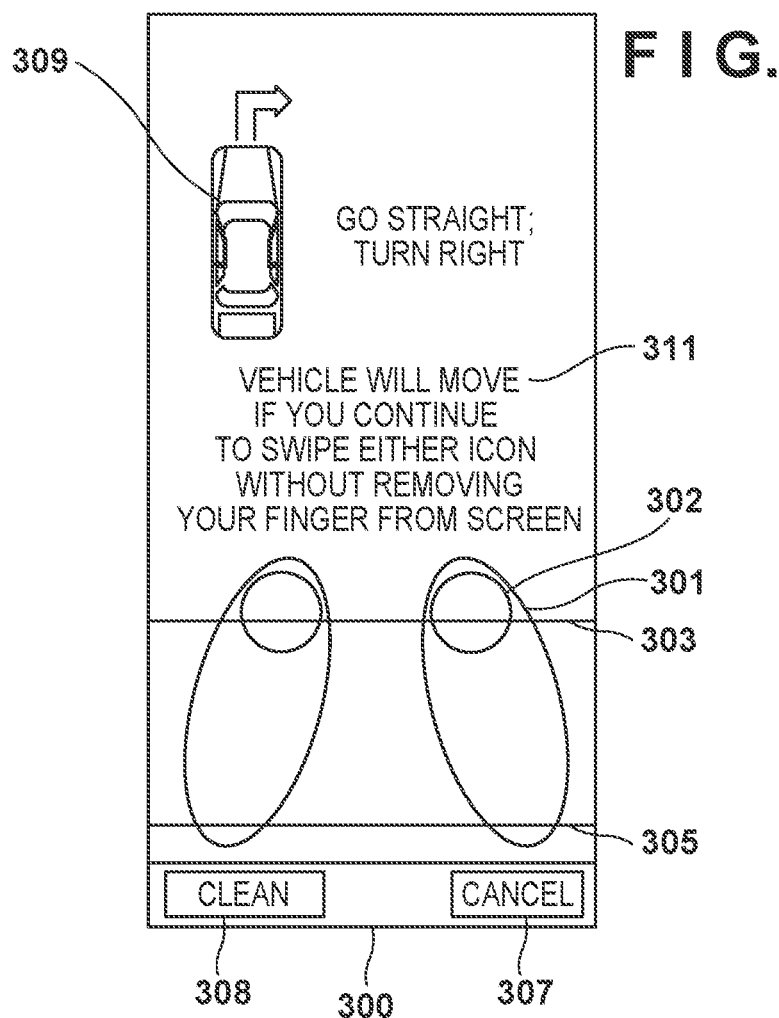
FIGS. 3A to 3C are views showing an example of an operation screen of the terminal device and examples of states in which the operation screen is operated.
Figures 3B, 3C:
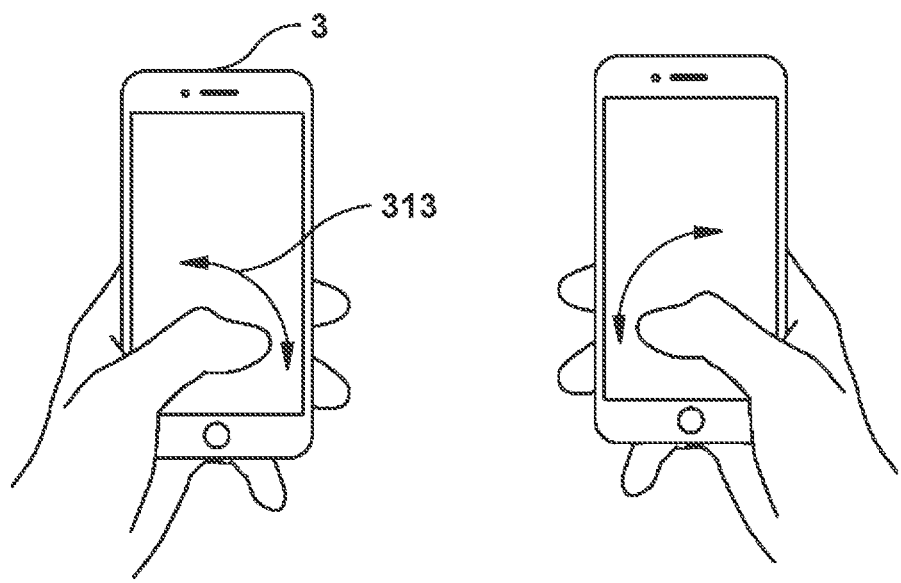

FIGS. 3A to 3C show an example of an initial screen of the remote parking application and examples of its operation method. FIG. 3A shows the initial screen. Operation guidance portions 301, state display portions 302, an upper guidance line 303, a lower guidance line 305, a cancel button 307, and a clean button 308 are displayed for operation on a screen 300. In addition, a track 309 of travel of the vehicle based on a track plan created by the track planning unit 43 and a guidance text 311 that have been acquired from the vehicle system 2 are displayed. The operation guidance portions 301 are display for guiding the screen operation by the operator, and two oval objects, each including a tilted axis, are displayed symmetrically on both the left side and the right side in the example of FIG. 3A. Each oval is arranged so that the locus of the swiping operation of the thumb of the operator will be included in a state in which the operator is holding the operation terminal 3 by one hand. The operation of each operation guidance portion 301 is merely a measure, and an operation need not always be performed within this range.

Each state display portion 302 shows the state of the remote parking application. An operation (to be referred to as an activation operation) for activating remote parking is performed by swiping the screen until a predetermined condition is satisfied, and the state display portion 302 displays that such a condition has been satisfied. For example, the satisfaction of the condition may be indicated by a changing the color, changing the shape, or the like. The condition may be, for example, a condition for actually starting the travel for parking. Alternatively, it may be a condition for a recommended operation (for example, the satisfaction of a recommended stroke (to be described later)).

The upper guidance line 303 and the lower guidance line 305 are lines that indicate an upper position (upper guidance position) and a lower position (lower guidance position), respectively, of a recommended stroke. The activation operation is an operation performed by repetitively swiping up and down the screen while in contact with the screen 300. Subsequently, if the number of strokes whose length exceeds a lower limit exceeds a predetermined reference value and the total distance of continuous swipes has exceeded a reference value, an instruction signal for starting the travel for parking will be transmitted to the vehicle system 2. The upper guidance line 303 is displayed as a guide for the position of the upper end point (to be also referred to as a maximum point or a maximum value) of this swiping operation. In a similar manner, the lower guidance line 305 is displayed as a guide for the position of the lower end point (to be also referred to as a minimum point or a minimum value) of the swiping operation. A stroke from the position above the upper guidance line 303 to the position below the lower guidance line 305 or from the position below the lower guidance line 305 to the position above the upper guidance line 303 is referred to as a recommended stroke. The length of this recommended stroke is referred to as the recommended stroke length. Although not displayed, an upper reference position and a lower reference position for determining a stroke of a lower limit length are set between the upper guidance line 303 and the lower guidance line 305. A stroke (to be also referred to as a minimum stroke or a smallest stroke) that goes across the upper reference position and the lower reference position is necessary for the activation operation, and the operation will need to be performed again if this condition is not satisfied. That is, the condition for the minimum stroke will be satisfied by making swiping operations across the upper guidance line 303 and the lower guidance line 305. Note that a component (to be referred to as a Y component) of a predetermined direction, for example, the up-and-down direction (to be also referred to as the vertical direction or the Y direction) of the stroke is referred in this embodiment, and a component (an X component) of the horizontal direction will be ignored.

The track 309 of travel is an image showing how the vehicle is to move from that point, and is displayed based on the information acquired from the track planning unit 43. The guidance text 311 is a character string that provides guidance to the operator on how to perform an operation. In the example of FIGS. 3A to 3C, it is shown that the vehicle is to make a right turn upon traveling straight after the start of travel. The cancel button 307 is a button for canceling the remote parking application. The context for remote parking in the vehicle system 2 may be completely deleted in accordance with the cancellation of the remote parking application. However, since completely deleting the context for remote parking in a state in which the operator cannot ride the vehicle may cause difficulties in subsequent handling of the vehicle, the deletion may be limited to a case in which the operator is not in such a state or to a case in which a function for remotely moving the vehicle has been prepared. The clean button 308 is a button to be pressed when water drops and dust that have adhered to the screen of the operation terminal 3 are to be wiped off. As will be described later, although the operation terminal 3 will self-detect the adherence of water drops and the like on the screen and prompt the operator to clean the screen, the operator may touch the clean button 308 if the operator wants to voluntarily clean the screen. Touching the clean button 308 will set a state (to be also referred to as a cleaning mode) in which contact on portions other than the clean button 308 and the cancel button 307 will be ignored. When the cleaning has been completed, the cleaning mode can be canceled and the screen can be returned to the normal state by, for example, touching the clean button 308 again by a predetermined operation. Note that in a case in which the position of the button is to be cleaned, for example, a function that turns the screen display upside down by rotating the operation terminal 3 so as switch upper and lower sides of the operation terminal can be used.

FIGS. 3B and 3C show a state in which an activation operation is performed by the left hand and the right hand, respectively, on the operation terminal 3. In FIG. 3B, an arrow 313 indicates the approximate locus of the thumb. A similar arrow is also shown in FIG. 3C. In this manner, it is arranged so that an operation along the operation guidance portion 301 can be naturally operated by one hand. The operator performs a reciprocating operation by, for example, moving a finger back and forth on the operation screen. A single way of this reciprocating operation is referred to as a stroke in this example. Note that each operation guidance portion 301 need not have an oval shape and may be, for example, an arrow along the locus such as the arrow 313 or be indicated by a strip or a line.

Example of Activation Operation

Figure 4A:
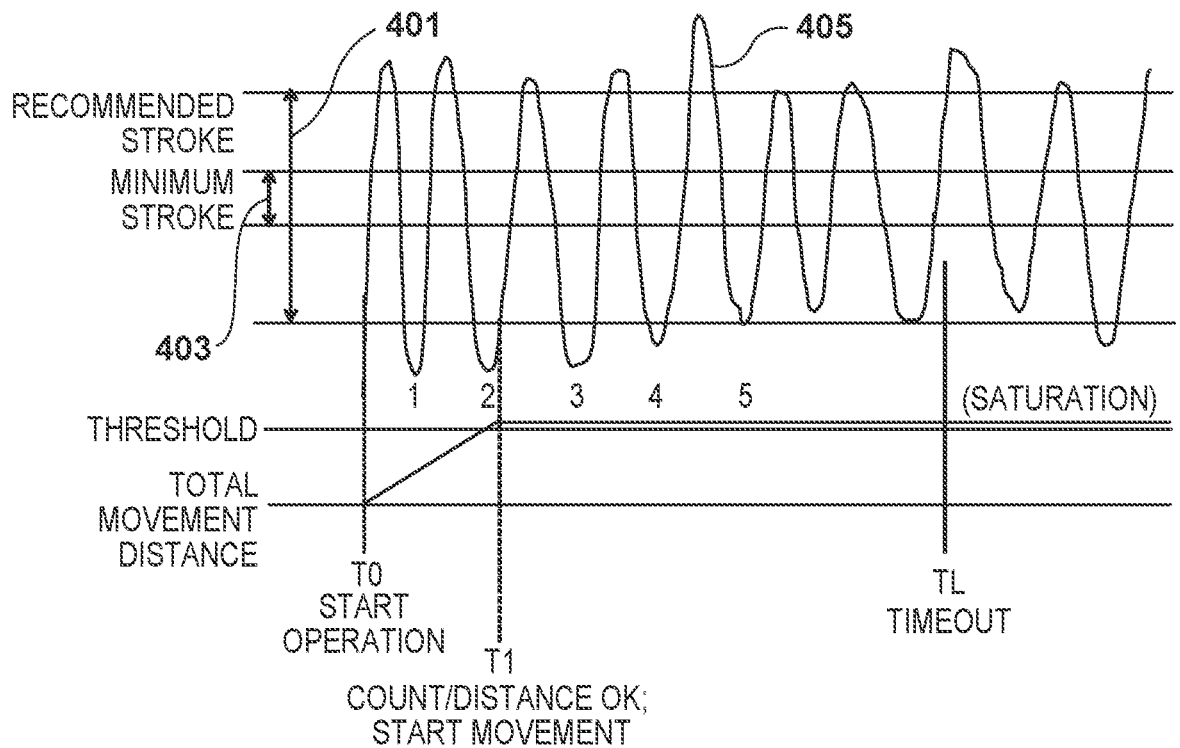
FIGS. 4A and 4B are views showing operation examples when parking is to be performed by operating the operation screen of the terminal device.

The activation operation will be further described with reference to FIGS. 4A and 4B and FIGS. 5A and 5B. FIG. 4A exemplifies a case in which the operator has continued to swipe while exceeding the recommended stroke. In FIG. 4A, a recommended stroke 401 indicates an interval between the upper guidance line 303 and the lower guidance line 305 of FIG. 3A. Also, a minimum stroke 403 indicates an interval between a predetermined upper reference position and a predetermined lower reference position. The position in the Y direction has been set for each of the upper guidance line 303 and the lower guidance line 305. The position in the Y direction has also been set for each of the upper reference position and the lower reference position. A waveform 405 indicates the temporal transition of the Y component of the swiped position. The abscissa of FIG. 4A indicates time, and transitions from left to right. A total movement distance is the cumulative distance of the swiping locus in the Y direction. A threshold is a predetermined reference value used for comparison when determining whether the total movement distance satisfies a condition.

In FIG. 4A, first, the operator touches below the position (to be referred to as a lower guidance position) of the lower guidance line. If a touch outside the minimum stroke range is detected or a maximum or minimum (to also be generically referred to as an extreme value) swipe up/down is detected outside the minimum stroke range after a touch has been performed within the minimum stroke range, it will be determined that an operation has started from that point of time. The operation starts at a timing t0 in FIG. 4A. Subsequently, since the operator has repetitively swiped up and down, and each swipe exceeds the minimum stroke and includes the recommended stroke, the up-and-down stroke count (to be also referred to as an operation count) will be counted, and determination as to whether the count has exceeded the reference value, that is, whether a condition set for an operation count has been satisfied will be determined. In this example, the operation count to be the reference is two reciprocating operations, that is, four single-way operations. Also, as the total movement distance, the recommended strokes will be accumulated if the recommended stroke has been exceeded. In this example, the total movement distance exceeds the threshold by the two reciprocating stroking operations and satisfies the condition set for the operation amount. As a result, since the conditions have been satisfied for both the operation count and the operation amount, a travel instruction for parking the vehicle is transmitted at a timing T1, and the movement of the vehicle is started. Subsequently, the travel instruction will be transmitted while the operator continues swiping, and the vehicle will also continue to operate. Note that if the start of the operation is not determined until a time limit TL, a timeout may be set and the remote parking function may be canceled. Also, in the case of a timeout, a warning by sound, characters, or an image may be output to notify the operator of this timeout. The start point of the time limit TL can be, for example, the point of time at which the operation screen 300 is first displayed in the procedure of FIGS. 9A and 9B (to be described later).

Figure 4B:
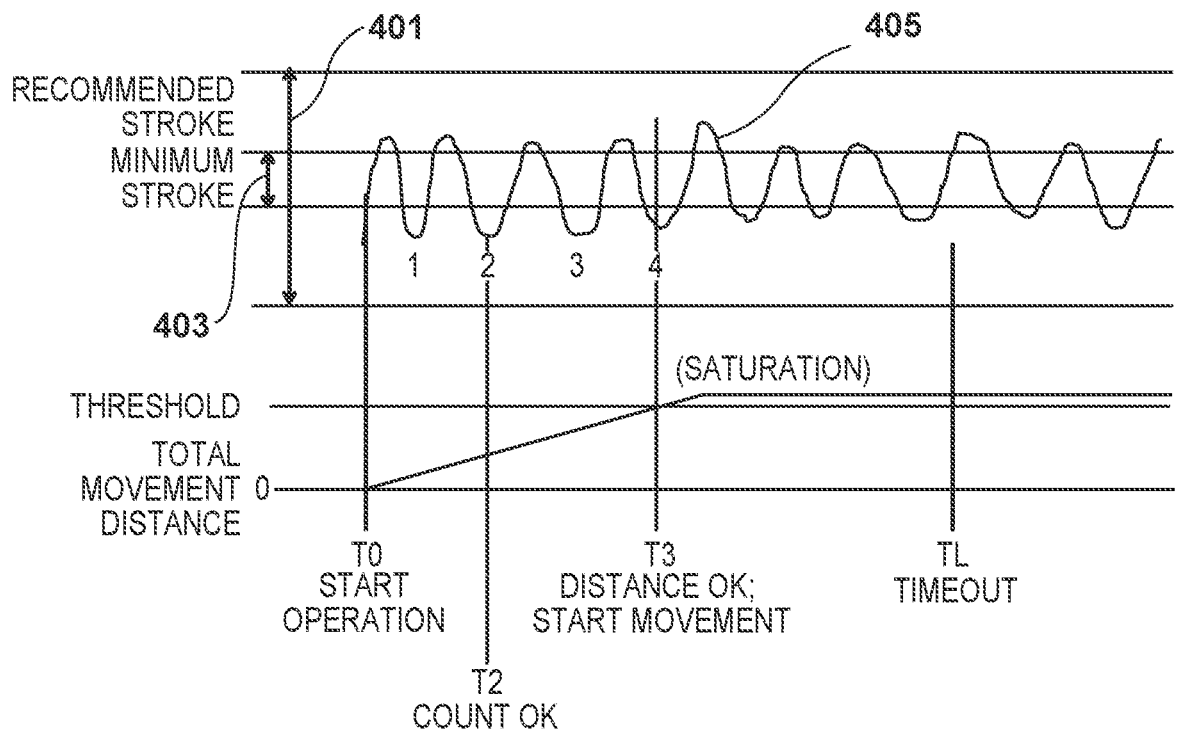

FIG. 4B exemplifies a case in which the operator has continued to make an operation satisfying the minimum stroke even though the operator has not made an operation that satisfies the recommended stroke. First, at the timing T0, the start of operation is determined because a touch has been performed outside the range of the minimum stroke. Subsequently, the operator continues to make a swiping operation (the waveform 405) that satisfies the minimum stroke even though the recommended stroke is not satisfied. Hence, the condition set for the operation count of two reciprocating operations is satisfied at a timing T2. Since each single stroke is short, the increase in the total movement distance is mild compared to that of FIG. 4A, and the condition for the operation amount is satisfied at a timing T3. Hence, the travel of the vehicle is started at the timing T3.

Figure 5A:
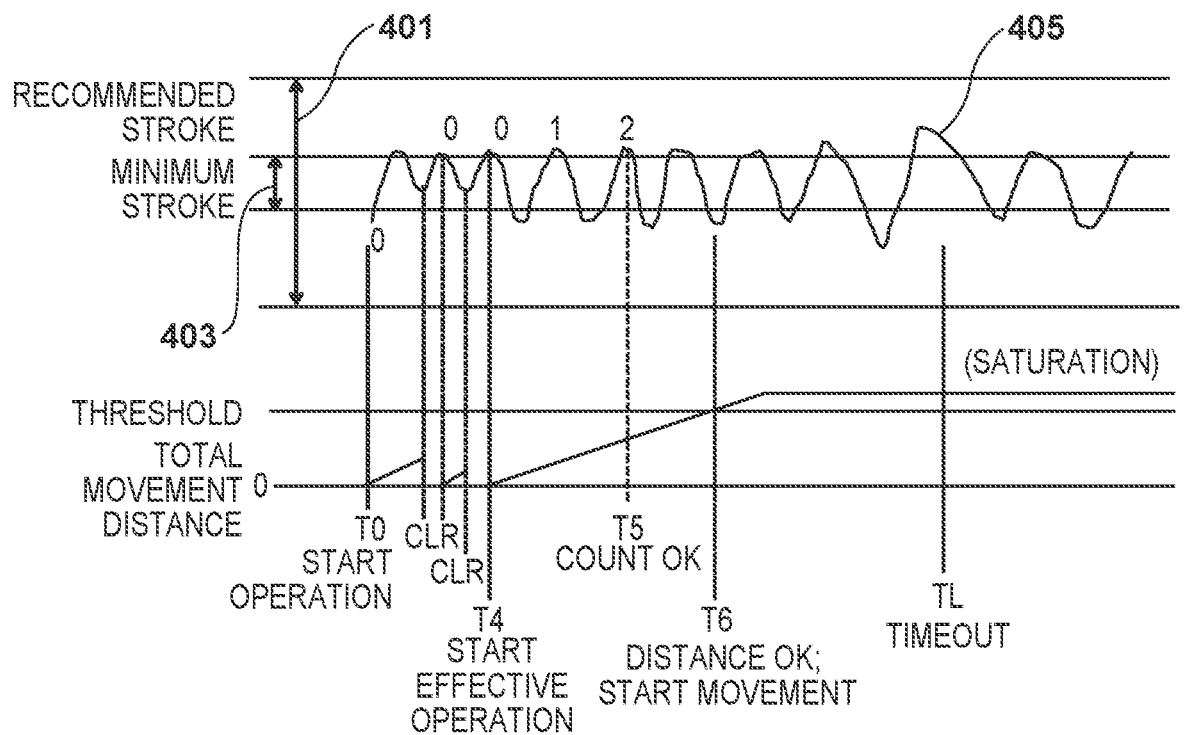
FIGS. 5A and 5B are views showing operation examples when parking is to be performed by operating the operation screen of the terminal device.

FIG. 5A exemplifies a case in which the strokes do not satisfy the minimum stroke. Although the operation is started from the timing T0, a downward swipe is input after the upper reference position has been exceeded once. However, since the operation is changed to an upward swiping operation before the lower reference position is reached, both the operation count and the operation amount are reset to 0. After this operation has been repeated twice, the start of operation is determined at a timing T4 this time. This timing T4 is ultimately set as the start timing (effective operation start) of the activation operation to start the travel of the vehicle. Subsequently, it is determined at a timing T5 that two reciprocating minimum stroke operations have been performed, and it is determined at a timing T6 that the total movement distance has exceeded the threshold. The travel of the vehicle is started from this point of time.

Figure 5B:
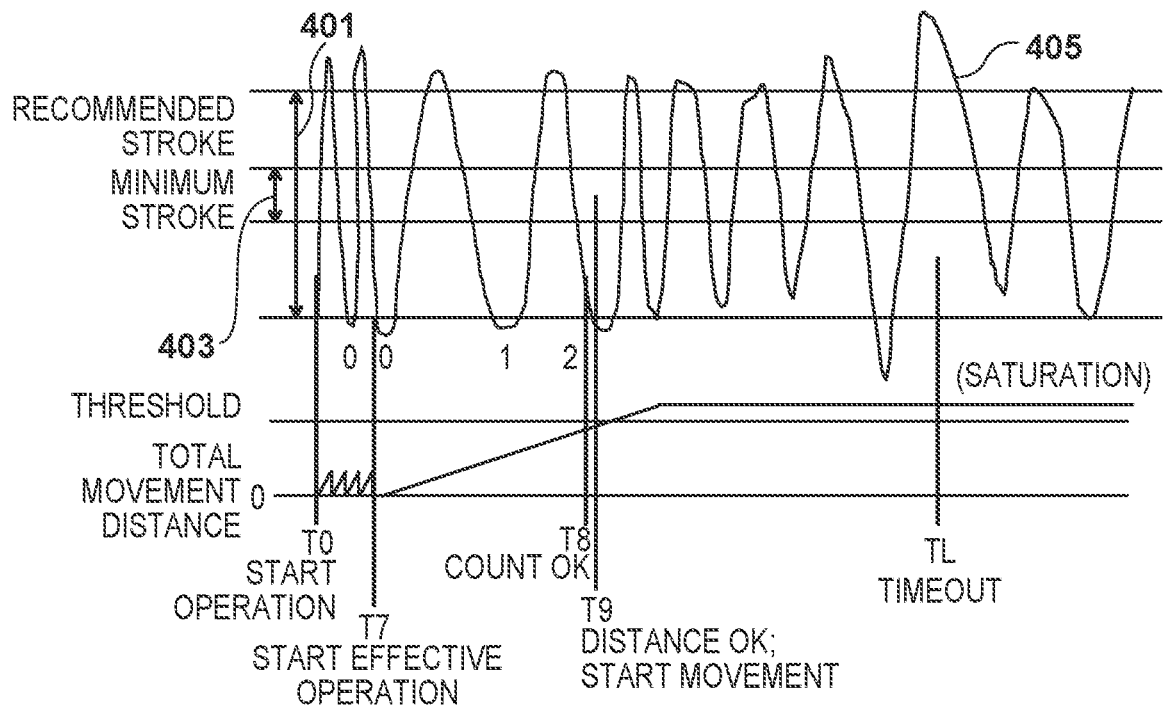

FIG. 5B exemplifies a case in which the swiping operation is too rapidly. The start of operation is determined once at the timing T0. However, since the subsequent swiping operation is performed too rapidly, a timing T7 at which the operation has become mild is set as the valid operation start timing. Subsequently, since the swipes are performed by strokes that exceed the recommended stroke, the condition for the operation count and the condition for the operation amount are satisfied at a timing T8 and a timing T9, respectively, and the travel of the vehicle is started. Note that the swiping speed may be determined from the time and movement distance or a function for obtaining the swiping speed may be used if such a function is provided by, for example, the operating system or the like of the operation terminal 3. The latter is assumed to be employed in this example.

Measure Against Raindrops

The operation for remote parking is performed as described above. This operation can be performed outdoors. In such a case, for example, in the case of a capacitive touch panel, a water drop such as a raindrop or the like may adhere to the operation screen 300 and be recognized as a touch or swiping operation. FIG. 6A shows an example of raindrops. Raindrops 601, 603, 605, and 607 have adhered to the screen 300 and have been detected as a touch (a touch-down event). Each raindrop may be detected as a touch if multi-touch is supported by the operation screen, and a touch may be detected at a composite position formed by the position of a raindrop if single-touch is supported. In such a case, a touch will be detected at a different position each time a raindrop adheres to a different position. If the raindrop flows, this movement can be detected as a swipe (a touch-move event). As a result, the activation operation for remote parking may be performed against the intention of the operator. Therefore, a measure to be described below will be taken.

Display Example 1

A first display example of a measure against raindrops according to this embodiment will be illustrated with reference to FIGS. 6A to 6C. The presence of raindrops will be determined in a case in which touches on a plurality of positions are detected as shown in FIG. 6A or in a case in which an intermittent or continuous touches to a position where an operation is not actually required has been detected on the screen 300 of the remote parking application. In such cases, a screen 610 shown in FIG. 6B will be displayed to prompt the operator to wipe off the raindrops. In FIG. 6B, raindrop marks 612 to 615 are displayed at the respective raindrop detection positions to clearly show the positions of the detected raindrops to the operator. In this example, a broken line circle is set about each detection position as a raindrop mark. This mark is merely an example as a matter of course, and the detection position may be clearly shown by coloring or flickering each detection position. At this time, buttons are hidden to prevent an erroneous operation, and a message 611 for the operator is displayed. Inputs to the screen 300 will be ignored during a predetermined period while this message is displayed. Subsequently, when it has changed to a state in which the touches (that is, raindrops) cannot be detected, the marks indicating the raindrops will be deleted, and a screen 620 of FIG. 6C will be displayed. As a result, it can be displayed that the raindrops have been wiped off. When a return button 618 is touched on this screen, the screen is returned to the screen 300. In this case, if the travel of the vehicle has not been started, the operation history up to this point will be completely deleted and the processing will be retried. If the travel of the vehicle has been started, the vehicle can be temporarily stopped, and the parking operation can be continued in accordance with the operation on the screen 300 again. In addition, in relation to the raindrop marks, each time a raindrop becomes undetectable, the raindrop mark arranged at the corresponding location may stop being displayed in a sequential manner.

Display Example 2

In the second example, when the adherence of a raindrop is determined, a screen 710 of FIG. 7A is displayed to prompt the operator to wipe off the raindrop. If a return button 713 is touched, the screen is returned to the screen 300. On the other hand, if a "clean" button 711 is pressed, the screen 610 of FIG. 6B is displayed. Inputs to the screen 300 are ignored for a predetermined period while this screen 610 is displayed. Subsequently, when it has changed to a state in which the touches (that is, the raindrops) cannot be detected, the screen 620 of FIG. 6C is displayed, and the screen is returned to the screen 300 if the return button 618 is pressed. In this case, if the travel of the vehicle has not been started, the operation history up to this point will be completely deleted and the processing will be retried. If the travel of the vehicle has been started, the vehicle can be temporarily stopped, and the parking operation can be continued in accordance with the operation on the screen 300 again. Note that the raindrop marks 612 to 615 may also be displayed in accordance with the positions of the raindrops on the screen 710 of FIG. 7A.

Display Example 3

In the third example, when the adherence of a raindrop is determined, a screen 720 of FIG. 7B is displayed to prompt the operator to wipe off the raindrop. When the return button 713 is touched, the screen is returned to the screen 300. On the other hand, if a swipe is detected on the screen in the state of FIG. 7B, the screen 610 of FIG. 6B is displayed to prevent an error input on the return button. This state is kept while the swiping continues. The screen 720 is displayed again when the swiping ends (when a touch-up event is detected). Inputs to the screen 300 are ignored for a predetermined period while this screen 710 is displayed. Subsequently, when it has changed to a state in which the touches (that is, the raindrops) cannot be detected, the screen 620 of FIG. 6C is displayed, and the screen is returned to the screen 300 if the return button 618 is pressed. In this case, if the travel of the vehicle has not been started, the operation history up to this point will be completely deleted and the processing will be retried. If the travel of the vehicle has been started, the vehicle can be temporarily stopped, and the parking operation can be continued in accordance with the operation on the screen 300 again. Note that the raindrop marks 612 to 615 may also be displayed in accordance with the positions of the raindrops on the screen 720 of FIG. 7B.

Figure 8:
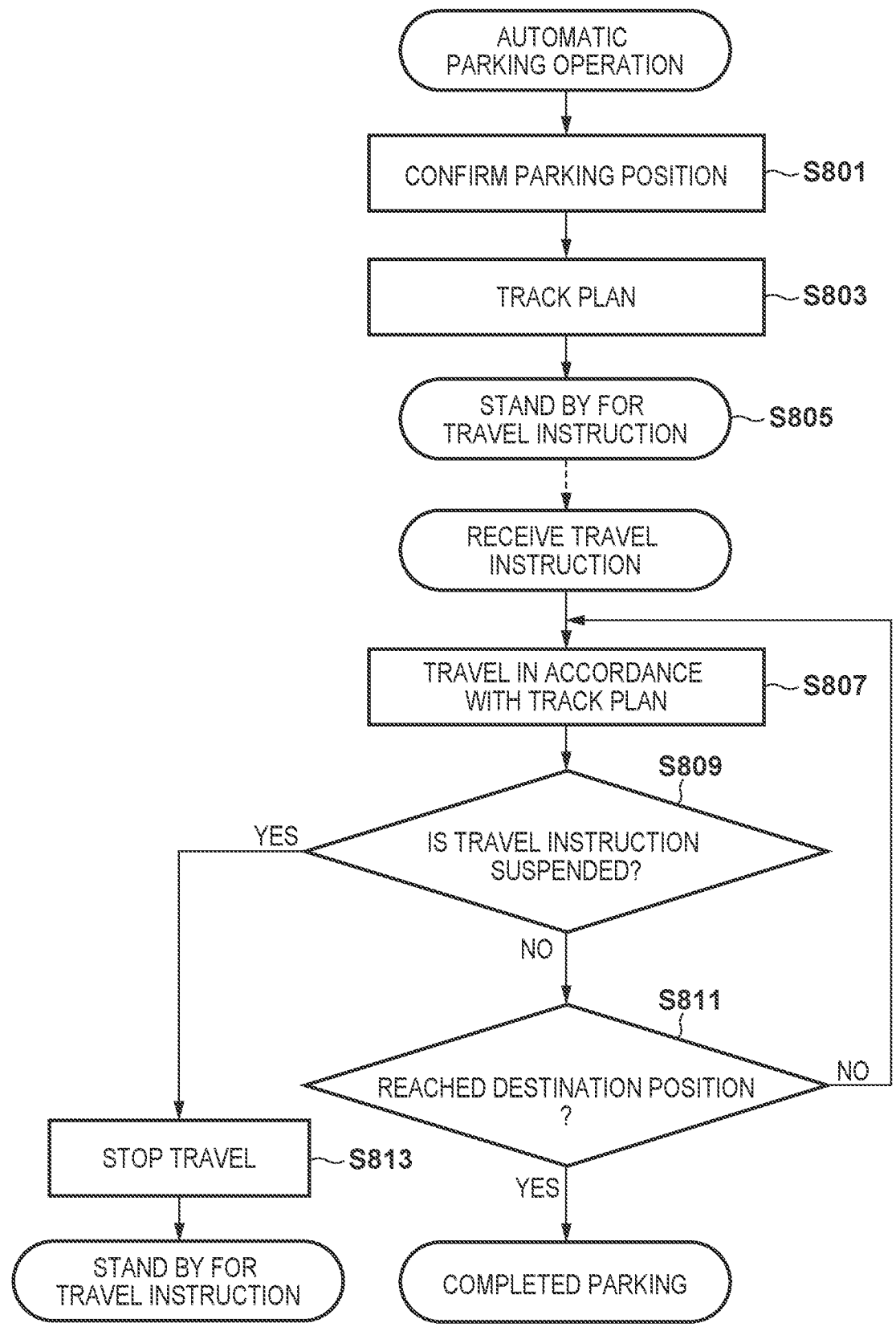
FIG. 8 is a flowchart showing an example of a control procedure by the automated driving vehicle when automatic parking is to be performed remotely.

The processing procedure for implementing the activation operation and the measure against raindrop as described above will be described with reference to FIGS. 8 to 13. FIG. 8 is a processing procedure performed by the vehicle system 2, and FIGS. 9 to 13 are processing procedures performed by the operation terminal 3. The procedure of FIG. 8 is executed by, for example, the control device 15, and the procedures of FIGS. 9 to 13 are executed by the processing unit 33, particularly, the CPU 211.

Remote Automatic Parking Operation by Vehicle System

FIG. 8 shows the procedure for setting remote automatic parking by the vehicle system 2. First, the driver (operator) uses the driving operation device 11 or the like to make an operation for remote automatic parking. In response to this operation, the vehicle system 2 prompts the driver to designate or confirm a parking position via display on the display unit 23 or the like. Subsequently, the vehicle system 2 uses the external sensor such as the camera, the LIDARs, and the like to confirm the state of the periphery of the vehicle (step S801), and causes the track planning unit 43 to create a track plan up to the parking position (step S803). This track plan is transmitted to the operation terminal 3 and is used as the basis of the display on the screen 300 of the remote parking application. Subsequently, the vehicle system stands by for a travel instruction (alternatively referred to as a move instruction) from the operation terminal 3 (step S805).

When a travel instruction (alternatively, a travel start instruction) is received, travel is started in accordance with the track plan (step S807). For example, if a travel instruction is suspended beyond a predetermined time (YES in step S809), the travel is stopped (step S813). Travel is continued until the vehicle reaches the destination position (step S811) unless the travel instruction is suspended. Note that in this example, the travel instruction is repeatedly received even after the start of the travel, and the suspension of the travel instruction in step S809 may indicate a state in which the continuously repeated travel instruction has been interrupted at least beyond a predetermined time. Alternatively, the suspension of the travel instruction may indicate a case in which a travel stop instruction has been received. As described above, parking is started upon remotely receiving the travel start instruction, and the parking operation is continued and completed in accordance with the travel instruction.

Processing Procedure Performed by Operation Terminal (Remote Parking Application)

FIGS. 9A to 13B show the processing procedures of the operation terminal 3. The remote parking application that is executed on the operating system installed in the operation terminal 3 will be mainly described here. In this example, the remote parking application uses a function provided by the operating system to acquire information related to the operation of the operation screen and communicate with the vehicle system 2. The function provided by the operating system differs for each system, and there may be an operating system which does not provide the function assumed to be provided by the operating system in this description. In such a case, the operating system may use a provided function to use the remote automatic parking to implement its function or may use, on the other hand, a function that has been provided but unused in this example.

Figure 9A:
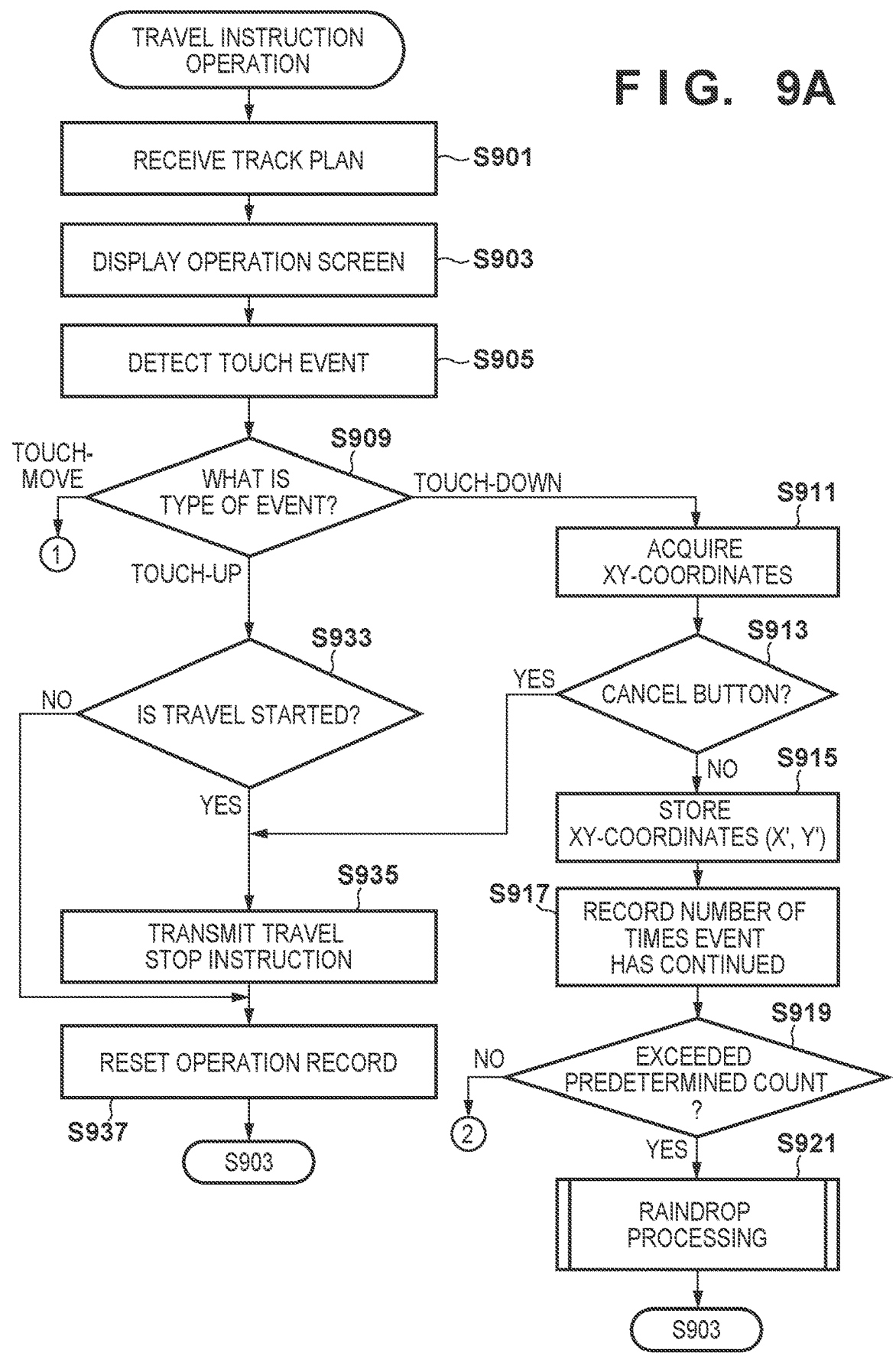
FIGS. 9A and 9B are flowcharts showing an example of a control procedure by the terminal device when automatic parking is to be performed remotely.
Figure 9B:
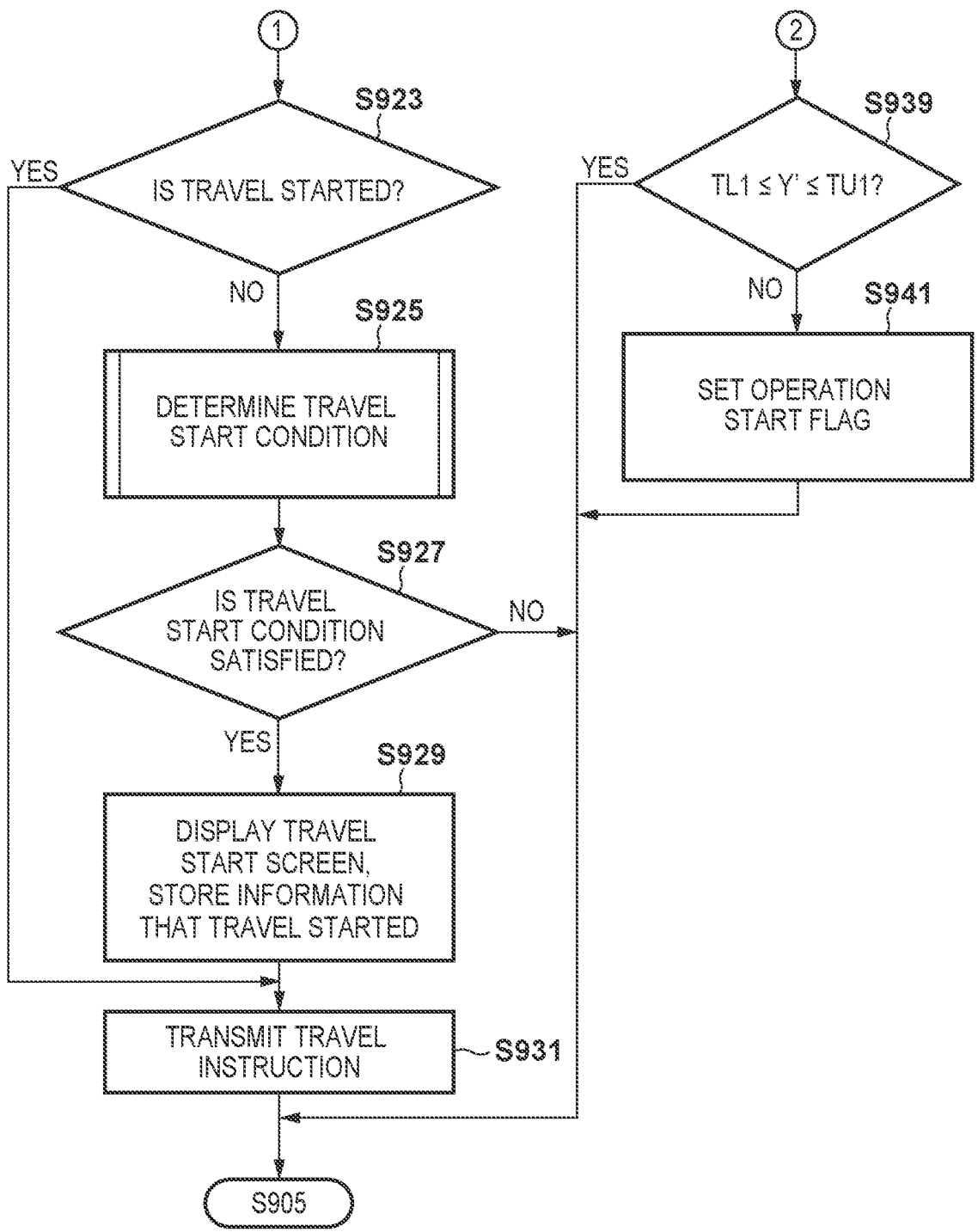

FIGS. 9A and 9B start from a state in which the remote automatic parking has completed the authentication of the operator (that is, the user). First, a track plan is received from the vehicle system 2 (step S901), and the operation screen 300 of FIG. 3A is displayed based on the received track plan (step S903). Note that in a case in which timeout control described in FIG. 4 and the like is to be performed, a timer for determining that the time limit TL has been reached can be activated in step S903. Subsequently, a touch event is detected on the operation screen (step S905), and the type of the event is determined (step S909). In this example, the touch events of the operation screen include, for example, a touch-down event in which a finger is placed on the screen, a touch-move event in which the finger moves in a state of contact with the screen, and a touch-up event in which the finger is removed from the screen.

In a case of a touch-down event, the XY-coordinate values of the contact position are acquired (step S911). In this case, the longitudinal direction of the smartphone serving as the operation terminal 3 is set as the Y-axis, and a direction perpendicular to this is set as the X-axis. If the acquired position is not the cancel button (No in step S913), the acquired coordinate values are stored as (X', Y') (step S915). Subsequently, the number of times the touch-down event has continued is recorded (step S917), and whether this number has exceeded a predetermined count is determined (step S919). The initial value of the counter for counting this number is 0, and the counter can be reset to the initial value when, for example, a touch-up event is detected. In addition, the position of each touch-down event can be stored and may be recorded as the number of continuous touch-down events based on a condition that the positions are apart by more than a predetermined distance from each other. Alternatively, the elapsed time since a touch-down event has been detected in a state in which the count value is 0 may be measured, and the fact that the measured elapsed time falls within a predetermined time may be further added as a condition to be satisfied in step S919. The predetermined count used in step S919 is the number of raindrops that have adhered to the operation screen 300. Although this number will depend on the size of the screen, and it may be set to, for example, about 2 to 4.

If it is determined in step S919 that the predetermined count has been exceeded, the raindrop processing will be executed (step S921), and the process branches to step S903 to redisplay the operation screen. On the other hand, if it is determined that the predetermined count has not been exceeded in step S919, this event will be determined to be an event in which a finger or the like has been placed on the operation screen, and a determination as to whether a Y component Y' of the detection position of the touch-down event is present between an upper reference position TU1 and a lower reference position TL1 will be performed (step S939). If the position Y' is not present between the upper and lower reference positions, an operation start flag will be set (step S941) by determining that the current timing is the operation start timing T0 described in FIG. 4A and the like. When a swipe is performed in a state in which the operation start flag is set, the measurement of the stroke count and the cumulative distance will be performed. If the position Y' is determined to be present between the upper reference position TU1 and the lower reference position TL1 in step S939, and also after step S941, the process will branch to step S905 to detect the next touch event.

On the other hand, if it is determined that the touch event in step S909 is a touch-up event, determination as to whether a "travel started state" has been set will be performed (step S933). A travel started state is information such as a flag or the like indicating that a travel instruction has been transmitted to the vehicle system 2, and this travel started state indicates that the vehicle has already started moving from the position where the vehicle was stopped before the remote parking operation was started. If it is determined that the travel started state is set, a travel stop instruction will be transmitted (step S935). If it is determined in step S933 that the travel started state is not set, and after the process of step S935, an operation record will be reset (that is, initialized) (step S937). Subsequently, the process branches to step S903, and the operation screen is redisplayed. The operation record is information indicating the state of operations recorded after the operation start flag has been set, and includes the operation start flag, information indicating the travel started state, the cumulative distance (operation amount) of swipes, the stroke count (operation count), and the like. That is, if the finger performing the operation is removed from the screen, the remote parking operation will be suspended and will be retried from the start. If the vehicle has already started to move, the remote parking will be retried by using the current position as a base point. Note that since the vehicle system 2 will stop traveling if the travel instruction is not received beyond a predetermined time, it may be arranged so that the transmission of the travel instruction will be stopped without a proactive transmission of a travel stop instruction. In such a case, the processes of steps S933 and S935 need not be performed, and the process of step S937 need only be performed.

If the touch event is determined to be a touch-move event in step S909, this touch-move event will be determined to be a swipe performed by the operator, and determination as to whether the travel started state is set will be performed (step S923). If it is determined that the travel started state is set, the travel instruction (also referred to as a move instruction) is transmitted to the vehicle system 2 in accordance with the swiping operation (step S931). If it is determined that the travel started state is not set, whether the condition for starting travel is satisfied is determined (step S925). As a result, determination as to whether a travel start condition (to be referred to as a move start condition) is satisfied is performed (step S927). The travel start condition includes a condition for the operation count and a condition for the operation amount, and the travel start condition will be determined to be satisfied if both of these conditions are satisfied. In this example, the condition for the operation count is the stroke count, and the condition for the operation amount is the cumulative distance of swipes in the Y direction. If it is determined that the travel start condition is satisfied, the travel start screen is displayed, and the information indicating the travel started state will be stored (step S929). Note that in a case in which a timer for determining that the time limit TL has been reached has been activated, the timer is stopped in step S929. Subsequently, the travel instruction is transmitted to the vehicle system 2 (step S931). If it is determined that the travel start condition is not satisfied in step S927, the process will branch to step S905 to detect an additional event. Note that the travel start screen displayed in step S929 may be a screen that displays, for example, the state display portion 302 of the screen 300 in a form different from the color or shape used up to this point. As a matter of course, a screen of another form may be used as long as the states before and after the travel instruction can be identified. The travel instruction of step S931 is repeatedly transmitted as long as a touch-move event, that is, a reciprocating operation performed by swiping is continued.

As described above, according to the procedure of FIGS. 9A and 9B, the operation terminal 3 can determine the travel start condition depending on the operation, and instruct the vehicle to perform parking by automated driving if the condition has been satisfied. Also, even in a case in which an unexpected touch occurs due to a raindrop or the like, it will be possible to take a measure against this occurrence. Furthermore, when the operator has suspended the operation by removing his/her hand from the operation screen 300 of the operation terminal 3 in the middle of the operation, it will be possible to cause the vehicle to suspend the parking operation. As a result, the operator will need to consciously perform each operation not only during the travel for parking but also before the start of the travel, and it will be possible to prevent the vehicle from moving due to an unexpected operation performed by the operator or an operation error caused by raindrops. Note that if the timer for determining whether the time limit TL has been reached is to be used, exception processing can be activated by the expiration of this timer to reset the operation record and to output a warning, indicating that the travel start condition was not satisfied within the time limit, to the operator.

The raindrop processing of step S921 will be described next. As described above, the raindrop processing can be performed in three methods, and any of the methods can be adopted. A commonality among the processing methods is that the movement of the vehicle and the operation thereof will be suspended once a raindrop is detected, and an opportunity for cleaning the screen will be provided to the operator while reducing the influence of the cleaning on the operation. Each of the three methods will be described here with reference to FIGS. 10 to 12 here.

Raindrop Processing (First Display Example)

Figure 10:
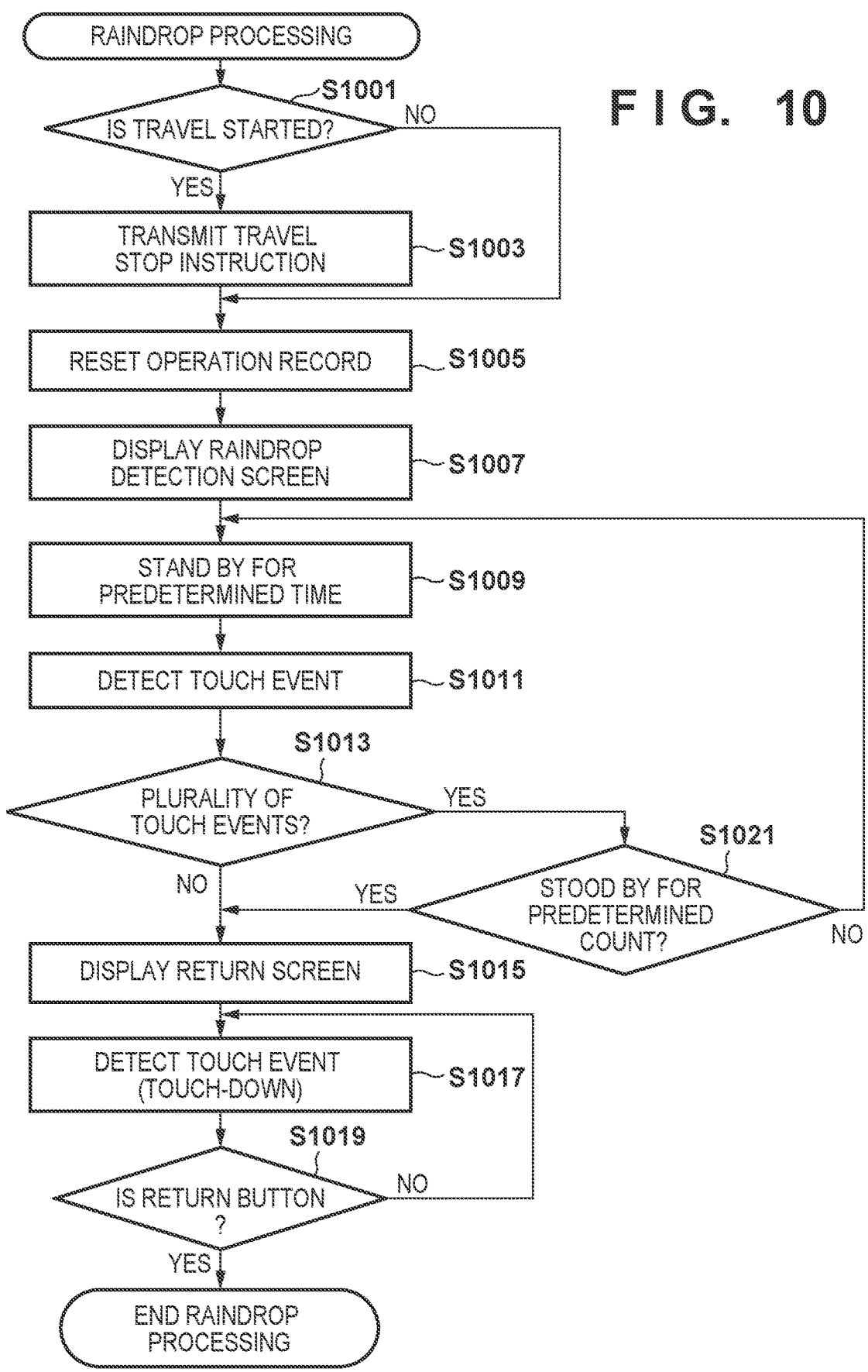
FIG. 10 is a flowchart showing an example of a procedure of raindrop processing by the terminal device when automatic parking is to be performed remotely.

FIG. 10 shows the first example. First, it is determined whether the travel started state is set (step S1001). If the travel started state is set, the travel stop instruction is transmitted to the vehicle system 2 (step S1003). As previously described, it may be arranged so that, instead of transmitting the travel stop instruction, only the transmission of the travel instruction will be stopped. Subsequently, the operation record is reset (step S1005). As a result, when the wiping of the raindrops has been completed, the process to return to the state before the start of travel, and the operation will be retried from this point. Subsequently, the raindrop detection screen 610 is displayed (step S1007). Although the raindrop detection screen 610 does not include control elements such as buttons or the like to be operated by the operator, a message for prompting the user to clean the operation screen is included, and notification is performed to prompt cleaning of the screen. Subsequently, a touch event is detected (step S1011) after standing by for a predetermined time (step S1009). The touch event to be detected here may be a touch-down event or a touch-move event. Whether a plurality of touch events (touch-down events or touch-move events) have been detected is determined (step S1013). If a plurality of touch events are determined, it will be determined that the raindrops still remain on the screen, and whether a standby count of step S1009 has reached a predetermined count will be determined (S1021). If the standby count has not reached the predetermined count, the standby is performed again (step S1009). On the other hand, the return screen 620 will be displayed (step S1015) if a touch event is not detected in step S1013 and it is determined that the raindrops have been wiped. Subsequently, upon detecting a touch event (touch-down event) on the screen 620 (step S1017), whether this event is a touch event on the return button 618 is determined (step S1019). If the event is determined to be a touch event on the return button, the raindrop processing will end. Note that although touches are detected in multiple locations in steps S1011 and S1013, this corresponds to a case in which the operation terminal is a multi-touch terminal, and it may be arranged so that a touch performed on a single location will be detected in other cases.

This arrangement is particularly needed in a case in which a single-touch operation terminal is to be used.

According to this procedure, when raindrops have been detected, an operation by the operator will not be accepted until the raindrops have been wiped off, and an operation will only be accepted first when it has been confirmed that the raindrops have been wiped off. Hence, an operation error due to raindrops on the operation terminal 3 can be prevented as much as possible.

Raindrop Processing (Second Display Example)

Figure 11:
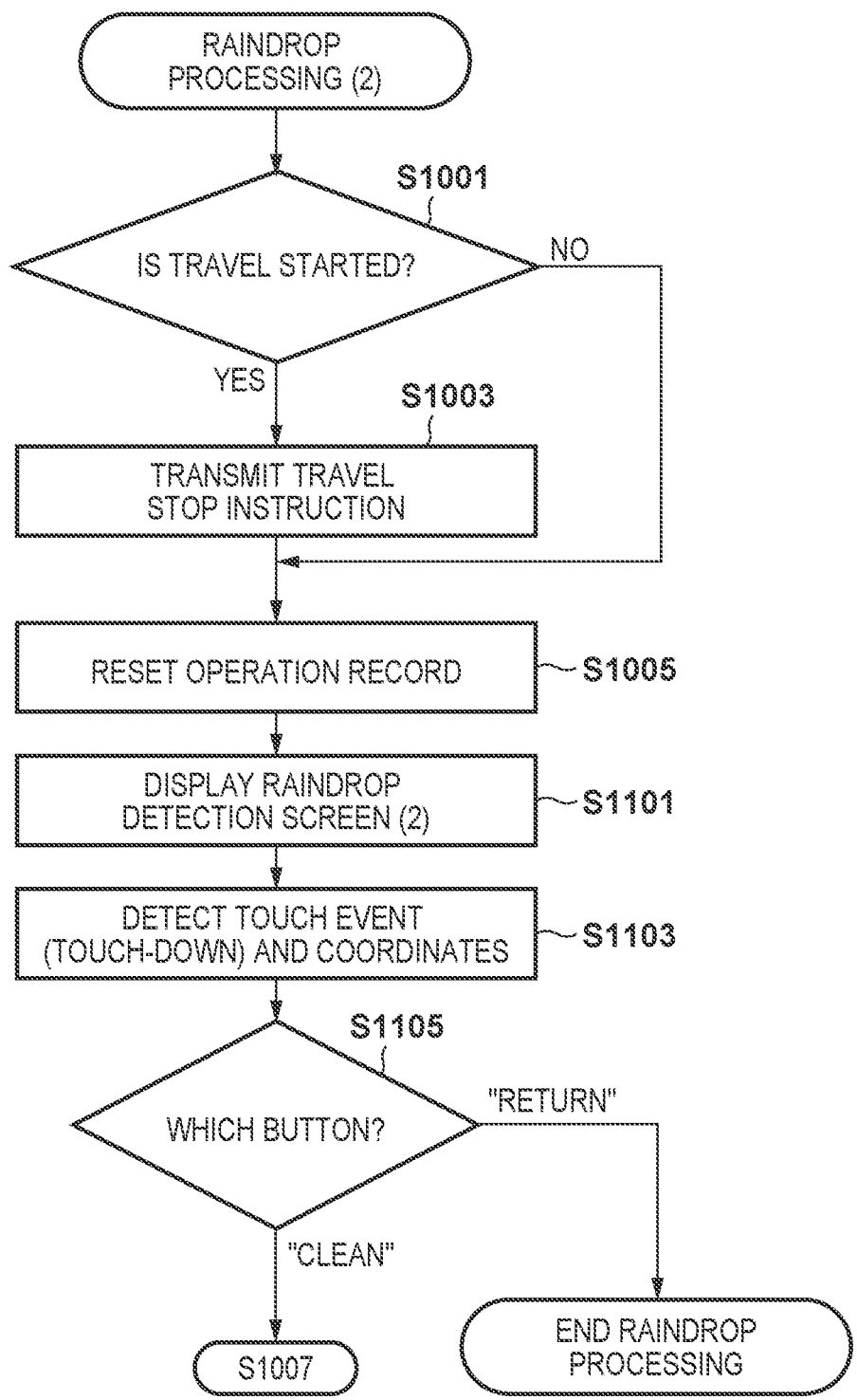
FIG. 11 is a flowchart showing another example of a procedure of raindrop processing by the terminal device when automatic parking is to be performed remotely.

FIG. 11 shows the second example. Note that same reference numerals are used to denote steps in common with those of FIG. 10, a description thereof may be omitted. The processes of steps S1001 to S1005 are in common with those of FIG. 10. Subsequently, a raindrop detection screen (2) 710 is displayed (step S1101). As buttons to be operated by the operator, a "return" button for returning the original operation screen and a clean button for cleaning the screen are displayed on the raindrop detection screen (2) 710 to allow the operator to display the operator's intention. Subsequently, a touch event is detected (step S1103), and whether the touched button is "return" or "clean" is determined after this detection (step S1105). If the touch event occurred in a location other than these buttons, the process may return to step S1103. If the "clean" button has been touched, the process will branch to step S1007 of FIG. 10. This will cause the raindrop detection screen 610 of FIG. 6B to be displayed. When cleaning is completed on this screen, the return screen 620 of FIG. 6C can be displayed. On the other hand, if the return button 713 is pressed, the raindrop processing will end.

According to this procedure, an operation for remote parking performed by the operator will not be accepted until the raindrops have been wiped off when the raindrops have been detected, and the operation for remote parking will be newly accepted again after it is confirmed that the raindrops have been wiped off. Hence, an operation error of the operation terminal 3 due to raindrops can be prevented as much as possible. Particularly, in this example, since the operator will need to actively input his/her intention to clean the screen, the operator can clean the screen by being clearly aware that he/she is performing a cleaning operation.

Raindrop Processing (Third Display Example)

Figure 12:
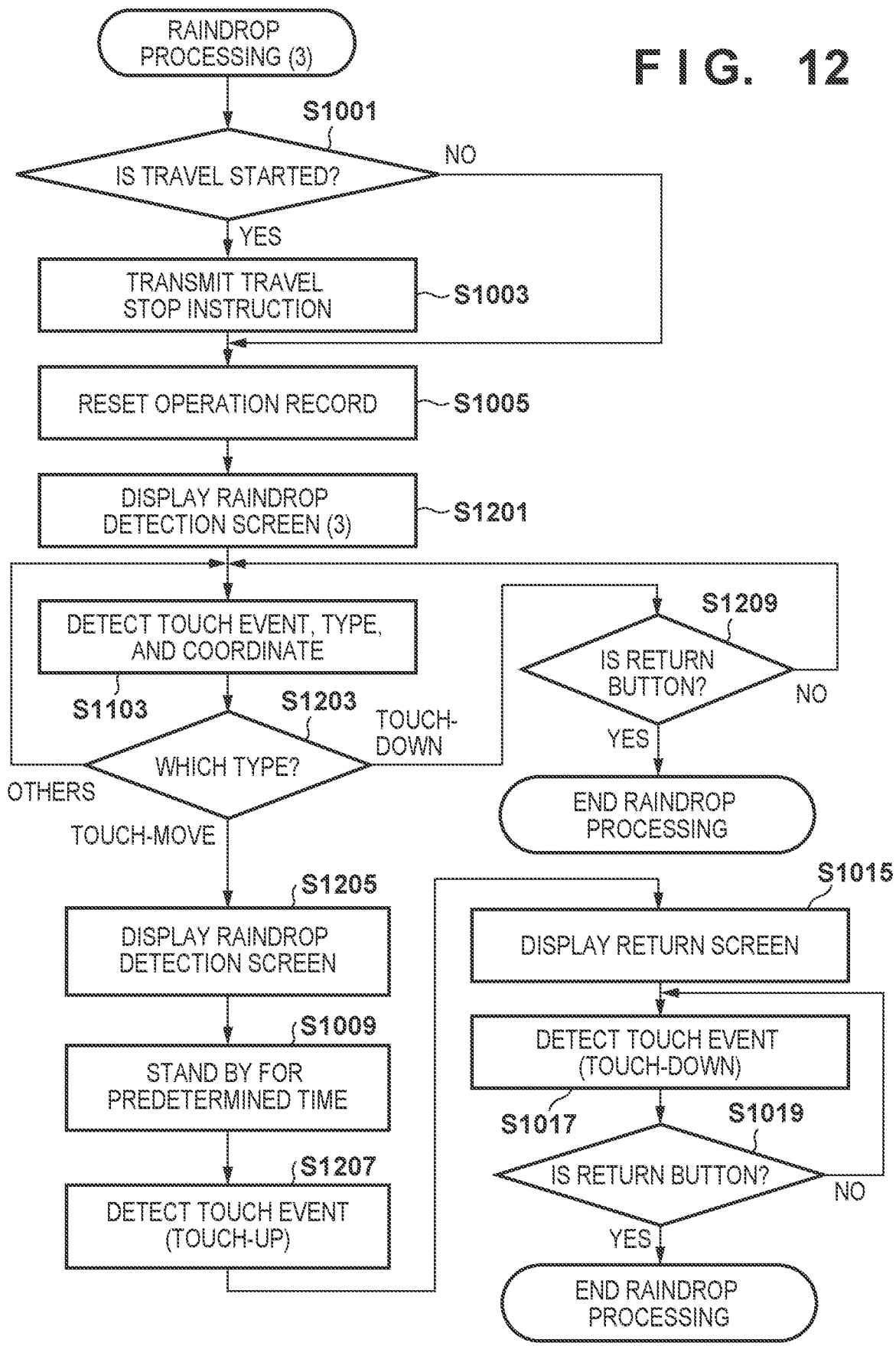
FIG. 12 is a flowchart showing yet another example of a procedure of raindrop processing by the terminal device when automatic parking is to be performed remotely.

FIG. 12 shows the third example. Note that same reference numerals are used to denote steps in common with those of FIG. 11, a description thereof may be omitted. The processes of steps S1001 to S1005 are in common with those of FIGS. 10 and 11. Subsequently, a raindrop detection screen (3) 720 is displayed (step S1201). A "return" button for returning to the original operation screen is displayed as a button to be operated by the operator in the raindrop detection screen (3) 720. Subsequently, a touch event (a touch-down event or a touch-move event) is detected (step S1103), and determination of the touch event is performed after this detection (step S1203). If the touch event is a touch-down event, whether the touched button is the "return" button will be determined (step S1209). If the touch event is a touch-move event, the raindrop detection screen 610 of FIG. 6B will be displayed (step S1205) by determining that a wiping operation is currently being performed, and a standby will be performed for a predetermined time (step S1009). Subsequently, detection of a touch event (touch-up event) will be performed (step S1207). If a touch-up event is detected, the return screen 620 will be displayed (step S1015) by determining that the touch-up event indicates the completion of the wiping of the raindrops. The subsequent processes are similar to those of the first example and the second example. Note that in step S1207, the process may advance to step S1015 upon expiration of the standby time.

According to this procedure, the operation for remote parking performed by the operator will not be accepted until the raindrops have been wiped off when the raindrops have been detected, and the operation for remote parking will be newly accepted again after it is confirmed that the raindrops have been wiped off. Hence, an operation error of the operation terminal 3 due to raindrops can be prevented as much as possible.

Travel Start Condition Determination Processing

Figure 13A:
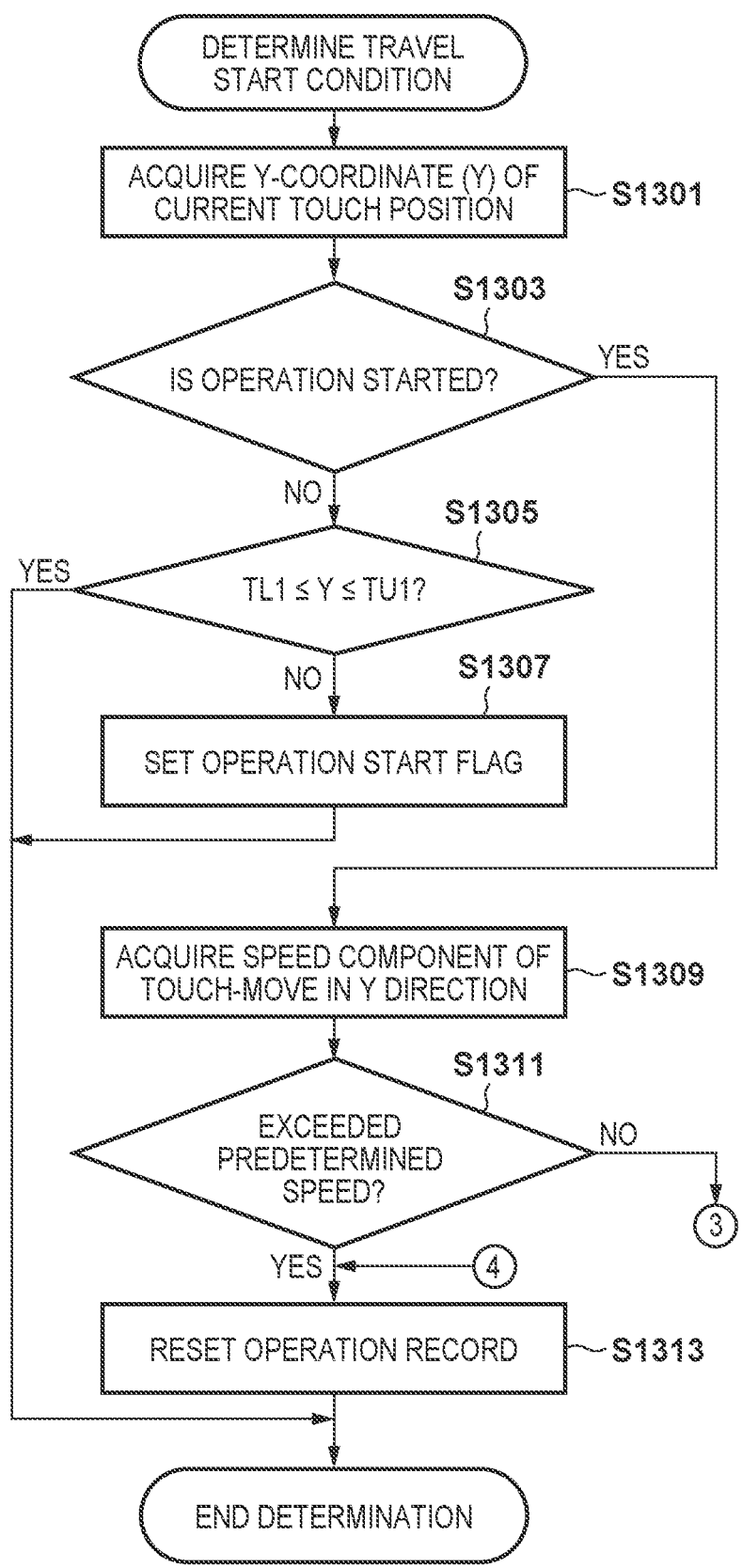
FIGS. 13A and 13B are flowcharts showing an example of a procedure for driving start determination by the terminal device when automatic parking is to be performed remotely.
Figure 13B:
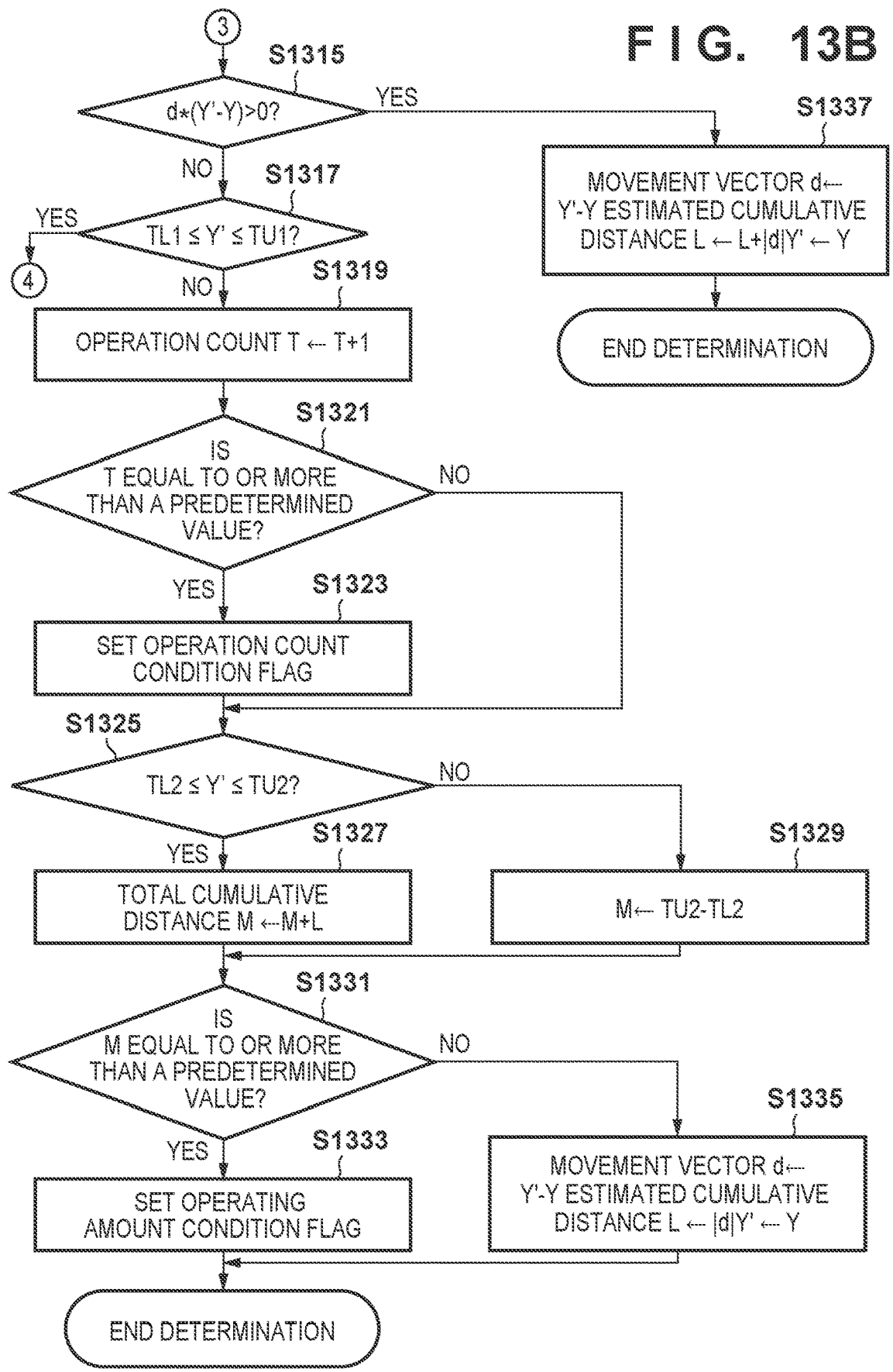

The travel start condition determination processing executed in step S925 of FIG. 9B will be described next with reference to FIGS. 13A and 13B. In this processing, whether the condition for causing the vehicle to start the parking operation has been satisfied is determined in accordance with the operation performed by the operator.

First, the Y-coordinate of the current touch position is acquired (step S1301). Next, whether the operation has already been started at this time is determined by referring to an operation start flag (step S1303). The initial value of the operation start flag is OFF. If it is determined that the operation has not already been started, whether the Y-coordinate of the current touch position is present between the upper reference position TU1 and the lower reference position TL1 will be determined (step S1305). If it is determined that the Y-coordinate is present between the upper reference position TU1 and the lower reference position TL1, the determination processing will end. This is because this position will not become the initial point for measuring the stroke count and the cumulative distance.

On the other hand, a case in which it is determined that the operation has not already been started and the acquired Y-coordinate is not present between the upper reference position TU1 and the lower reference position TL1 is a case in which the operating finger has moved from between the upper reference position TU1 and the lower reference position TL1 to an area outside of these positions by swiping. Hence, the operation start flag will be set in this case (step S1307). On the other hand, if it is determined in step S1303 that the operation has already been started, the speed component of the touch-move event in the Y direction is acquired by a function provided by the operating system (step S1309). Subsequently, whether this speed exceeds a predetermined speed is determined (step S1311). If the speed exceeds the predetermined speed, the operation record up to this point will be reset (step S1313), and the processing will end. This case corresponds to a case in which the speed of the swiping operation is too rapid as exemplified in FIG. 5B. As a result, the operations performed up to this point will be deleted, and a standby will be performed until an operation is newly performed at an appropriate speed. Note that in a case in which the speed itself of the touch-move event cannot be acquired, the speed may be obtained based on the movement distance of the coordinate and the duration of the touch-move event. Alternatively, the average speed of swiping over predetermined time may be obtained instead of a local speed, and this average speed may be referred in step S1311.

If it is determined in step S1311 that the speed of the touch-move event does not exceed the predetermined speed, the sign of a product between a movement amount d of the previously detected touch-move event and a movement amount Y'−Y of the currently detected touch-move event is determined (step S1315). Assume that 0 is included as a negative value here. The movement amount d of the previously detected touch-move event is a value that has been acquired by storing the movement amount Y'−Y of a previous event. A movement amount in this case is an amount of movement along the Y-axis, and the sign indicates the direction of the movement. That is, it can be said that the movement amount is a one-dimensional vector (movement vector). If the sign of the product between the previous movement amount and the current movement amount is positive, it can be determined that the previous touch-move event and the current move event have occurred in the same direction along the Y-axis. If the sign is negative, it can be determined that the previous touch-move event and the current touch-move event have occurred in different directions. Since a case in which the product is 0 indicates that the movement of the point due to swiping is a movement along the X-axis, it will be handled in a manner similar to a case in which the product is a negative value by determining this movement to be a peak in this example. If it is determined that the touch-move events have occurred in the same direction, the current movement amount Y'−Y is stored as the movement amount d, the absolute value of the movement amount d is added to a temporary cumulative movement distance L, and the previously stored position Y' is updated by the current position Y (step S1337). The respective processes of step S1337 need to be performed in this order. The swiping distance used in the determination of the travel start condition is referred to as a "total cumulative distance" here, and the temporary cumulative movement distance L is the stroke distance of a single swipe down or a single swipe up. After the process of step S1337, the processing ends. Note that if there is a possibility that determining an extreme value by using only two adjacent vectors will cause an error in the determination result, a composite vector of a plurality of continuous movement vectors may be used for the determination.

On the other hand, if the sign of the product obtained in step S1315 is negative, that is, if it is determined that the previous touch-move event and the current touch-move event have occurred in different directions, it can be determined that the coordinate value Y' obtained in the previous touch-move event is the maximum value or the minimum value (to be generically referred to as an extreme value or a peak) in the Y direction. Hence, in such a case, determination as to whether this extreme value is present between the upper reference position TU1 and the lower reference position TL1 will be performed (step S1317). If it is determined that the extreme value is present between the upper reference position and the lower reference position, it will be determined to be a swipe with a stroke that is less than a minimum stroke as shown in FIG. 5A. Therefore, the process will branch to step S1313, and the operation will be retried from the start.

In step S1317, if it is determined that the Y-coordinate value Y' of the previous event, that is, the extreme value is positioned outside the upper reference position TU1 and the lower reference position TL1, 1 is added to a single-way operation count T (step S1319). This operation count T is the number of operations counted by setting a single stroke operation as 1, and corresponds to the swipe operation count from a peak to a peak in the opposite direction.

Although examples in which this operation count is counted based on a reciprocating stroke operation as a unit were shown in FIGS. 4A and 4B and FIGS. 5A and 5B, it may be counted based on a single-way stroke operation as a matter of course. The operation count is counted based on a single-way stroke operation in the example of FIGS. 13A and 13B. Determination as to whether this operation count T is equal to or more than a predetermined value will be performed (step S1321). If the operation count T is determined to be equal to or more than the predetermined value, it will be determined that the condition of the operation count has been satisfied and an operation count condition flag will be set (step S1323). Note that since the condition for the operation count is set to two reciprocating operations in the examples of FIGS. 4A and 4B and FIGS. 5A and 5B, a value of 4 obtained by, for example, converting this condition into single-way operations may be set as the predetermined value. This value is, as a matter of course, merely an example.

If it is determined that the operation count T has not reached the predetermined value in step S1321 or in a process after step S1323, determination as to whether the coordinate value Y' that is, the peak acquired in the previous touch-move event is present between a upper guidance position TU2 and a lower guidance position TL2 (step S1325). The upper guidance position TU2 and the lower guidance position TL2 are positions in the Y direction of the upper guidance line 303 and the lower guidance line 305, respectively, shown in FIG. 3A. If it is determined that the position Y' is present between the upper guidance position TU2 and the lower guidance position TL2, it will be determined that the stroke up to the peak has not reached the recommended stroke, and the temporary cumulative movement distance L will be added to a total cumulative distance M (step S1327). That is, if the stroke has not exceeded the recommended stroke, the distance in the Y direction of the actually performed stroke operation will be added to the total cumulative distance M. On the other hand, if it is determined in step S1325 that the position Y' is not present between the upper guidance position TU2 and the lower guidance position TL2, it will be determined that the stroke up to the peak has reached the recommended stroke, and the distance between the upper guidance position TU2 and the lower guidance position TL2 will be added to the total cumulative distance M (step S1329). Note that the total cumulative distance M will be reset to 0 at the start of the processing and also be set to 0 by the resetting of the operation record. In addition, in the determination as to whether a stroke is a recommended stroke, although a stroke can be determined not to be a recommended stroke at only one end point, it may not be possible to determine that the stroke is recommended stroke. Hence, in the determination of step S1325, the Y-coordinate value determined to be the extreme value will be stored once, and in a case in which one of the stored previous extreme value and the current extreme value is larger than the upper guidance position TU2 and the other is smaller than the lower guidance position TL2, a stroke that has an upper end and a lower end corresponding to these peaks may be determined to be a recommended stroke.

When the total cumulative distance M has been updated, whether the value of M is equal to or more than a predetermined value will be determined (step S1331). This predetermined value differs from the predetermined value referred in the process of step S1321 as a matter of course. According to the examples of FIGS. 4A and 4B and FIGS. 5A and 5B, this predetermined value may be a value which is approximately four times the recommended stroke. If it is determined that the total cumulative distance M is equal to or more than the predetermined value, it will be determined that the condition for the operation amount has been satisfied, and the operation amount condition flag will be set (step S1333). Otherwise, the movement amount d will be stored as the movement amount Y'−Y, the absolute value of the movement amount d will be substituted to the temporary cumulative movement distance L. and the previously stored position Y' will be updated by the current position Y (step S1335). The processes of step S1335 need to be perform in this order.

As described above, by the processing and the arrangement according to this embodiment, the travel of the vehicle for parking can be started first when the operator has consciously performed an operation. In addition, the travel of the vehicle can be stopped when the operator stops performing an operation. Hence, remote parking of the vehicle can be performed when the operation by the operator is clearly intentional. Furthermore, even in a state in which water drops such as raindrops will adhere to the operation screen, it will be possible to prevent an operation error due to the water drops.

Note that the above-described embodiment includes the reciprocating operation count and the distance of the reciprocating operation as the condition for the start of travel, only the count or the distance may be included as the condition. Also, although the operation speed is set as a condition, the operation speed may be excluded as a condition. In addition, although the minimum stroke and the recommended stroke are set, these strokes may be made to match so that only the minimum stroke will be set. Furthermore, it may be arranged so that the guidance portion 301, the upper guidance line 303, the lower guidance line 305, and the like will not be displayed in the screen to be displayed in the process of step S929 of FIG. 9B.

The invention is not limited to the foregoing embodiments, and various variations/changes are possible within the spirit of the invention.

Summary of Embodiment

The above-described embodiment can be summarized as follows.

(1) According to the first mode of the present invention, there is provided a vehicle control apparatus that includes an operation screen including a contact sensor and remotely issues an instruction to move a vehicle, wherein output of the instruction to move the vehicle is started based on a reciprocating operation on the operation screen in a case in which the reciprocating operation has satisfied a predetermined condition, and the predetermined condition includes a condition related to at least one of a cumulative distance and a count of a stroke of the reciprocating operation.

According to this arrangement, since the movement of the vehicle will be started first when a condition for a predetermined operation related to the operation is satisfied, it is possible to prevent the movement of the vehicle from being started by an operation unintended by the operator.

(2) According to the second mode of the present invention, there is provided the vehicle control apparatus of (1), wherein the predetermined condition further includes a fact that the condition related to at least one of the cumulative distance and the count is satisfied within a predetermined time limit, and a warning is output in a case in which the condition related to at least one of the cumulative distance and the count is not satisfied within the predetermined time limit.

According to this arrangement, it is possible to alert the operator of the fact that an operation is awaited.

(3) According to the third mode of the present invention, there is provided the vehicle control apparatus of (1) or (2), wherein the predetermined condition further includes a fact that a length of the stroke exceeds a lower limit length, and the condition related to at least one of the cumulative distance and the count targets the stroke which has exceeded the lower limit length.

According to this arrangement, it is possible to prevent an instruction to the vehicle from being output based on a careless operation by the operator.

(4) According to the fourth mode of the present invention, there is provided the vehicle control apparatus of (3), wherein the predetermined condition includes a fact that the cumulative distance has exceeded a predetermined value, and the cumulative distance is initialized in a case in which the stroke does not reach the lower limit length.

According to this arrangement, in a case in which an operation which does not satisfy the condition is performed, the operator is made to retry the operation to prevent a careless operation from being performed by the operator.

(5) According to the fifth mode of the present invention, there is provided the vehicle control apparatus of (3) or (4), wherein the predetermined condition includes a fact that the count has exceeded a predetermined value, and the count is initialized in a case in which the stroke does not reach the lower limit length.

According to this arrangement, in a case in which an operation which does not satisfy the condition is performed, the operator is made to retry the operation to prevent a careless operation from being performed by the operator.

(6) According to the sixth mode of the present invention, there is provided the vehicle control apparatus of any one of (1) to (5), wherein the predetermined condition further includes a fact that a speed of the reciprocating operation is lower than a predetermined speed, and the condition related to at least one of the cumulative distance and the count targets the stroke operated at a speed lower than the predetermined speed.

According to this arrangement, it is possible to prevent an instruction to the vehicle from being output based on a careless operation by the operator.

(7) According to the seventh mode of the present invention, there is provided the vehicle control apparatus of (6), wherein the predetermined condition includes a fact that the cumulative distance has exceeded a predetermined value, and the cumulative distance is initialized in a case in which the speed of the reciprocating operation has reached the predetermined speed.

According to this arrangement, in a case in which an operation which does not satisfy the condition is performed, the operator is made to retry the operation to prevent a careless operation from being performed by the operator.

(8) According to the eighth mode of the present invention, there is provided the vehicle control apparatus of (6) or (7), wherein the predetermined condition includes a fact that the count has exceeded a predetermined value, and the count is initialized in a case in which the speed of the reciprocating operation has reached the predetermined speed.

According to this arrangement, in a case in which an operation which does not satisfy the condition is performed, the operator is made to retry the operation to prevent a careless operation from being performed by the operator.

(9) According to the ninth mode of the present invention, there is provided the vehicle control apparatus of any one of (1) to (8), wherein the stroke is a component in a predetermined direction of the reciprocating operation.

According to this arrangement, it is possible to suppress the operability from being influenced by variation in the operation due a physical difference, an operation habit, or the like of the operator.

(10) According to the 10th mode of the present invention, there is provided the vehicle control apparatus of any one of (1) to (9), wherein the operation screen includes a display portion, and the display portion displays a guide for the reciprocating operation.

According to this arrangement, the operability can be improved because the operator need only operate in accordance with the guidance by display.

(11) According to the 11th mode of the present invention, there is provided the vehicle control apparatus of (10), wherein the guide includes display indicating a range of the reciprocating operation.

According to this arrangement, the operability can be improved because the operator can easily perform an operation that satisfies the condition by performing an operation in accordance with the guidance by display.

(12) According to the 12th mode of the present invention, there is provided the vehicle control apparatus of (10) or (11), wherein in a case in which the reciprocating operation has satisfied the predetermined condition and the output of the instruction to move the vehicle is started, display indicating the start of the output of the instruction to move the vehicle is performed.

According to this arrangement, the operator can view the display to learn that the movement of the vehicle has been started.

What is claimed is:

1. A vehicle control apparatus that includes an operation screen including a contact sensor and remotely issues an instruction to move a vehicle,
    wherein output of the instruction to move the vehicle is started based on a reciprocating operation on the operation screen in a case in which the reciprocating operation has satisfied a predetermined condition, and
    the predetermined condition includes a condition related to at least one of a cumulative distance and a count of a stroke of the reciprocating operation,
    wherein the predetermined condition further includes a fact that a length of the stroke exceeds a lower limit length, and
    the condition related to at least one of the cumulative distance and the count targets the stroke which has exceeded the lower limit length.

2. The apparatus according to claim 1, wherein the predetermined condition further includes a fact that the condition related to at least one of the cumulative distance and the count is satisfied within a predetermined time limit, and
    a warning is output in a case in which the condition related to at least one of the cumulative distance and the count is not satisfied within the predetermined time limit.

3. The apparatus according to claim 1, wherein the predetermined condition includes a fact that the cumulative distance has exceeded a predetermined value, and
    the cumulative distance is initialized in a case in which the stroke does not reach the lower limit length.

4. The apparatus according to claim 1, wherein the predetermined condition includes a fact that the count has exceeded a predetermined value, and
    the count is initialized in a case in which the stroke does not reach the lower limit length.

5. The apparatus according to claim 1, wherein the predetermined condition further includes a fact that a speed of the reciprocating operation is lower than a predetermined speed, and the condition related to at least one of the cumulative distance and the count targets the stroke operated at a speed lower than the predetermined speed.

6. The apparatus according to claim 5, wherein the predetermined condition includes a fact that the cumulative distance has exceeded a predetermined value, and the cumulative distance is initialized in a case in which the speed of the reciprocating operation has reached the predetermined speed.

7. The apparatus according to claim 5, wherein the predetermined condition includes a fact that the count has exceeded a predetermined value, and the count is initialized in a case in which the speed of the reciprocating operation has reached the predetermined speed.

8. The apparatus according to claim 1, wherein the stroke is a component in a predetermined direction of the reciprocating operation.

9. The apparatus according to claim 1, wherein the operation screen includes a display portion, and the display portion displays a guide for the reciprocating operation.

10. The apparatus according to claim 9, wherein the guide includes display indicating a range of the reciprocating operation.

11. The apparatus according to claim 9, wherein in a case in which the reciprocating operation has satisfied the predetermined condition and the output of the instruction to move the vehicle is started, display indicating the start of the output of the instruction to move the vehicle is performed.

* * * * *